(12) United States Patent
Lee et al.

(10) Patent No.: US 12,554,971 B2
(45) Date of Patent: *Feb. 17, 2026

(54) METHOD OF PREDICTING CHARACTERISTICS OF SEMICONDUCTOR DEVICE AND COMPUTING DEVICE PERFORMING THE SAME

(71) Applicant: Samsung Electronics Co., Ltd., Suwon-si (KR)

(72) Inventors: Jonghyun Lee, Hwaseong-si (KR); Gwangnae Gil, Yongin-si (KR); Seyoung Park, Hwaseong-si (KR); Sola Woo, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 994 days.

This patent is subject to a terminal disclaimer.

(21) Appl. No.: 17/699,489

(22) Filed: Mar. 21, 2022

(65) Prior Publication Data

US 2023/0053696 A1 Feb. 23, 2023

(30) Foreign Application Priority Data

Aug. 19, 2021 (KR) .................. 10-2021-0109559

(51) Int. Cl.
*G06F 17/00* (2019.01)
*G06F 30/367* (2020.01)
(Continued)

(52) U.S. Cl.
CPC .......... *G06N 3/047* (2023.01); *G06F 30/367* (2020.01); *G06N 3/08* (2013.01)

(58) Field of Classification Search
CPC .......... G06N 3/047; G06N 3/08; G06N 3/048; G06N 3/094; G06N 3/045; G06N 3/0475; G06N 3/04; G06F 30/367; G06F 3/0442
(Continued)

(56) References Cited

U.S. PATENT DOCUMENTS 7,155,689 B2 12/2006 Pierrat et al.
10,796,068 B2 10/2020 Kwon et al.
(Continued)

FOREIGN PATENT DOCUMENTS

CN 111931950 A 11/2020
JP 2019-0021123 A 2/2019
(Continued)

*Primary Examiner* — Jason T Edwards
(74) *Attorney, Agent, or Firm* — Fish & Richardson P.C.

(57) ABSTRACT

To predict characteristics of a semiconductor device, basic training data corresponding to a combination of process data, device data and simulation result data are generated using a plurality of compact models. Each compact model generates the simulation result data indicating characteristics of a semiconductor device corresponding to the device data by performing simulation based on the device data, the plurality of compact models respectively corresponding to a plurality of process data and a plurality of semiconductor products. A deep learning model is trained based on the basic training data such that the deep learning model outputs prediction data indicating the characteristics of the semiconductor device. Target prediction data indicating characteristics of the semiconductor device included in a target semiconductor product are generated based on the deep learning model, the device data and the process data corresponding to the target semiconductor product.

12 Claims, 18 Drawing Sheets

(51) Int. Cl.
*G06N 3/047* (2023.01)
*G06N 3/08* (2023.01)

(58) Field of Classification Search
USPC .......................................................... 706/21
See application file for complete search history.

(56) References Cited

U.S. PATENT DOCUMENTS

| | | |
|---|---|---|
| 10,867,111 B2 | 12/2020 | Kim et al. |
| 10,867,246 B1* | 12/2020 | Nguyen ................. G06N 20/00 |
| 10,969,773 B2 | 4/2021 | Yennie et al. |
| 2017/0103153 A1* | 4/2017 | Asenov ................... G06F 30/23 |
| 2019/0004504 A1* | 1/2019 | Yati ......................... H01L 22/20 |
| 2019/0122911 A1* | 4/2019 | Briggs .............. H01L 21/67271 |
| 2019/0370955 A1* | 12/2019 | Zhang ................. G06F 18/2431 |
| 2021/0081592 A1 | 3/2021 | Dandy et al. |
| 2022/0034829 A1* | 2/2022 | Yokoyama ............. G01N 25/18 |
| 2022/0366223 A1* | 11/2022 | Fathallah-Shaykh ....................... G06N 3/084 |
| 2023/0004988 A1* | 1/2023 | Bhatt ..................... G06N 3/091 |

FOREIGN PATENT DOCUMENTS

| | | |
|---|---|---|
| JP | 2020-043270 A | 3/2020 |
| JP | 2020-0184123 A | 11/2020 |
| KR | 10-2020-0030428 A | 3/2020 |
| KR | 10-2020-0057297 A | 5/2020 |

* cited by examiner

FIG. 8

| SP | PGC | PT | PG | PR | CM |
|---|---|---|---|---|---|
| SP1 | CB1 | PT1 | PG1 | PR1 | CM1 |
| SP2 | CB2 | PT1 | PG2 | PR2 | CM2 |
| SP3 | CB3 | PT1 | PG3 | PR3 | CM3 |
| SP4 | CB4 | PT2 | PG1 | PR4 | CM4 |
| SP5 | CB5 | PT2 | PG2 | PR5 | CM5 |
| SP6 | CB6 | PT2 | PG3 | PR6 | CM6 |
| SP7 | CB7 | PT3 | PG1 | PR7 | CM7 |
| SP8 | CB8 | PT3 | PG3 | PR8 | CM8 |
| SP9 | CB9 | PT3 | PG2 | PR9 | NONE |

ESP → SP4
TSP → SP9

FIG. 10

| INPUT DATA(X) | | OUTPUT DATA(Y) | |
|---|---|---|---|
| DEVICE DATA(DV) | PROCESS DATA(PR) | PREDICTION DATA(PD) | UNCERTAINTY DATA(UC) |
| $W$ | $D_k$ | $V_t$ | $U_m$ |
| $L$ | $D_d$ | $G$ | $U_d$ |
| $T_{op}$ | $T_{act}$ | $V_{bk}$ | |
| $V_d$ | $IOG$ | $I_d$ | |
| $V_g$ | $tSP$ | | |
| $V_b$ | | | |
| $V_s$ | | | |

METHOD OF PREDICTING CHARACTERISTICS OF SEMICONDUCTOR DEVICE AND COMPUTING DEVICE PERFORMING THE SAME

CROSS-REFERENCE TO RELATED APPLICATION

This U.S. non-provisional application claims priority under 35 USC § 119 to Korean Patent Application No. 10-2021-0109559, filed on Aug. 19, 2021, in the Korean Intellectual Property Office (KIPO), the disclosure of which is incorporated by reference herein in its entirety.

BACKGROUND

1. Technical Field

Example embodiments relate generally to semiconductor integrated circuits, and more particularly to a method of predicting characteristics of semiconductor device based on deep learning and a computing device performing the method.

2. Discussion of the Related Art

With development of the electronics industry, the design technology co-optimization (DTCO), in which the design of a semiconductor product is checked based on available manufacturing processes, is increasingly important. For example, in the foundry industry, a manufacturer may provide a device model corresponding to a target process level and a designer may design and simulate the semiconductor product using the device model. However, a change of the target process level may lead to a change of the device model. In this case, the designer has to change the established design, and it may take an impractical and/or an enormous amount of time to newly perform a simulation based on the changed design, and accordingly, extra cost may be incurred to the manufacture and/or time loss may be incurred to the designer. Moreover, if the accuracy of a model performing the simulation is low, the performance of designed and manufactured product may be degraded due to inaccurate prediction of the characteristics of the semiconductor device.

SUMMARY

Some example embodiments may provide a method of predicting characteristics of semiconductor device based on deep learning and a computing device performing the method, capable of efficiently predicting characteristics of semiconductor devices.

According to some example embodiments, of predicting characteristics of a semiconductor device included in a target semiconductor product, the method being performed by at least one processor executing program codes, the program codes being stored in computer readable media, the method includes generating basic training data corresponding to a combination of process data, device data, and simulation result data using a plurality of compact models, each of the plurality of compact models generating the simulation result data by performing a simulation based on the device data, the simulation result data indicating characteristics of semiconductor devices corresponding to the device data, the plurality of compact models respectively corresponding to a plurality of process data and a plurality of semiconductor products; training a deep learning model based on the basic training data such that the deep learning model is configured to output prediction data; and generating target prediction data based on the deep learning model, the device data, and the process data corresponding to the target semiconductor product such that the target prediction data indicates characteristics of the semiconductor device included in the target semiconductor product.

According to some example embodiments, a method of a semiconductor device in a target semiconductor product, the method being performed by at least one processor executing program codes, the program codes being stored in computer readable media, the method includes, generating basic training data corresponding to a combination of process data, device data and simulation result data using a plurality of compact models, each of the plurality of compact models generating the simulation result data by performing a simulation based on the device data, the simulation result data indicating characteristics of a semiconductor device corresponding to the device data, the plurality of compact models respectively corresponding to a plurality of process data and a plurality of semiconductor products; training a deep learning model based on the basic training data such that the deep learning model is configured to output prediction data and uncertainty value, the prediction data indicating the characteristics of the semiconductor device and the uncertainty value indicating uncertainty of the prediction data; retraining the deep learning model based on the uncertainty data; and generating target prediction data based on the deep learning model, the device data, and the process data corresponding to the target semiconductor product such that the target prediction data indicates characteristics of the semiconductor device included in a target semiconductor product included in the target semiconductor product.

According to some example embodiments, a computing device includes a computer readable medium storing program codes and a plurality of compact models, the program codes being executed by the at least one processor to generate a deep learning model using the plurality of compact models, each of the plurality of compact models generating simulation result data by performing a simulation based on the device data, the simulation result data indicating characteristics of semiconductor devices corresponding to the device data, the plurality of compact models respectively corresponding to a plurality of process data. and a plurality of semiconductor products; and at least one processor, the at least one processor, when executing the program codes, configured to generate basic training data corresponding to a combination of process data, device data and simulation result data using the plurality of compact models, train the deep learning model based on the basic training data such that the deep learning model is configured to output prediction data, and generate target prediction data based on the deep learning model, the device data and the process data corresponding to the target semiconductor product such that the target prediction data indicates characteristics of the semiconductor device included in the target semiconductor product.

The method and the computing device, according to some example embodiments, may efficiently predict the characteristics of the semiconductor device included in the new semiconductor product, by generating the basic training data including the process data using the established compact models corresponding to the previous semiconductor products and training the deep learning model based on the basic training data.

In addition, the method and the computing device according to some example embodiments may provide the deep learning model configured to precisely predict the characteristics of the semiconductor device by training the deep learning model to output the prediction data indicating the characteristics of the semiconductor device and the uncertainty data indicating the uncertainty of the prediction data and retraining the deep learning model based on the uncertainty data.

In addition, the method and computing device according to some example embodiments may efficiently provide the deep learning model configured to precisely predict the characteristics of the semiconductor device by determining the method of retraining the deep learning model based on the type of the uncertainty of the prediction data.

Through the enhanced prediction performance of the deep learning model, the time and/or the cost of designing and/or manufacturing the semiconductor product including the semiconductor device and the performance of the semiconductor product may be enhanced.

BRIEF DESCRIPTION OF THE DRAWINGS

Example embodiments of the present disclosure will be more clearly understood from the following detailed description taken in conjunction with the accompanying drawings.

FIGS. 7 and 8 are diagrams for describing relationship between a plurality of semiconductor products and a target semiconductor product in a method of predicting characteristics of semiconductor device according to some example embodiments.

FIG. 10 is a diagram illustrating data in a method of predicting characteristics of semiconductor device according to some example embodiments.

DETAILED DESCRIPTION OF THE EMBODIMENTS

Figure 1:
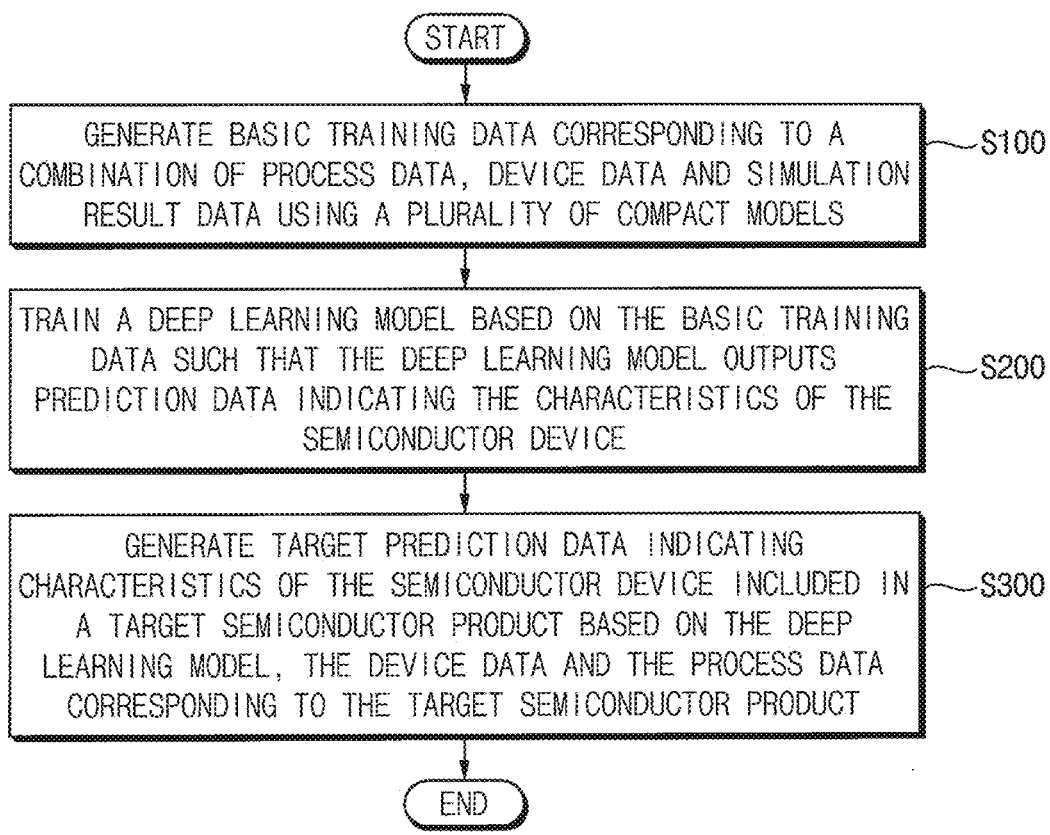
FIG. 1 is a flowchart illustrating a method of predicting characteristics of semiconductor device according to some example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flowchart illustrating a method of predicting characteristics of semiconductor device based on deep learning according to example embodiments. At least a portion of the method may be performed by executing program codes by at least one processor. The program codes may be stored in computer readable media. The computer readable media may be, for example, a non-transistor computer readable media. The term "non-transitory," as used herein, is a description of the medium itself (e.g., as tangible, and not a signal) as opposed to a limitation on data storage persistency (e.g., RAM vs. ROM).

Referring to FIG. 1, basic training data corresponding to a combination of process data, device data and simulation result data may be generated using a plurality of compact models (S100).

As will be described below with reference to FIGS. 7 and 8, the plurality of compact models may respectively correspond to a plurality of process data and a plurality of semiconductor products. As will be described below with reference to FIG. 8, each compact model corresponding to each process data and each semiconductor product may generate the simulation result data indicating characteristics of a semiconductor device corresponding to the device data by performing simulation based on the device data. As will be described below with reference to FIG. 10, the device data may indicate, e.g., structure and operation condition of the semiconductor device and the process data may indicate, e.g., condition of manufacturing process of the semiconductor device.

A deep learning model may be trained based on the basic training data such that the deep learning model outputs prediction data indicating the characteristics of the semiconductor device (S200). As will be described below with reference to FIG. 10, the simulation result data and the prediction data may indicate electrical characteristics of the semiconductor device.

Target prediction data indicating characteristics of the semiconductor device included in a target semiconductor product may be generated based on the deep learning model, the device data, and the process data corresponding to the target semiconductor product (S300). As will be described below with reference to FIGS. 7 and 8, the target semiconductor product may be a new semiconductor product that is not included in the plurality of semiconductor products corresponding to the plurality of compact models.

As such, the method and the computing device according to some example embodiments may efficiently predict the characteristics of the semiconductor device included in the new semiconductor product, by generating the basic training data including the process data using the established compact models corresponding to the previous semiconductor products and training the deep learning model based on the basic training data. Through the enhanced prediction performance of the deep learning model the time and/or the cost of designing and manufacturing the semiconductor product including the semiconductor device and the performance of the semiconductor product may be enhanced.

Figure 2:
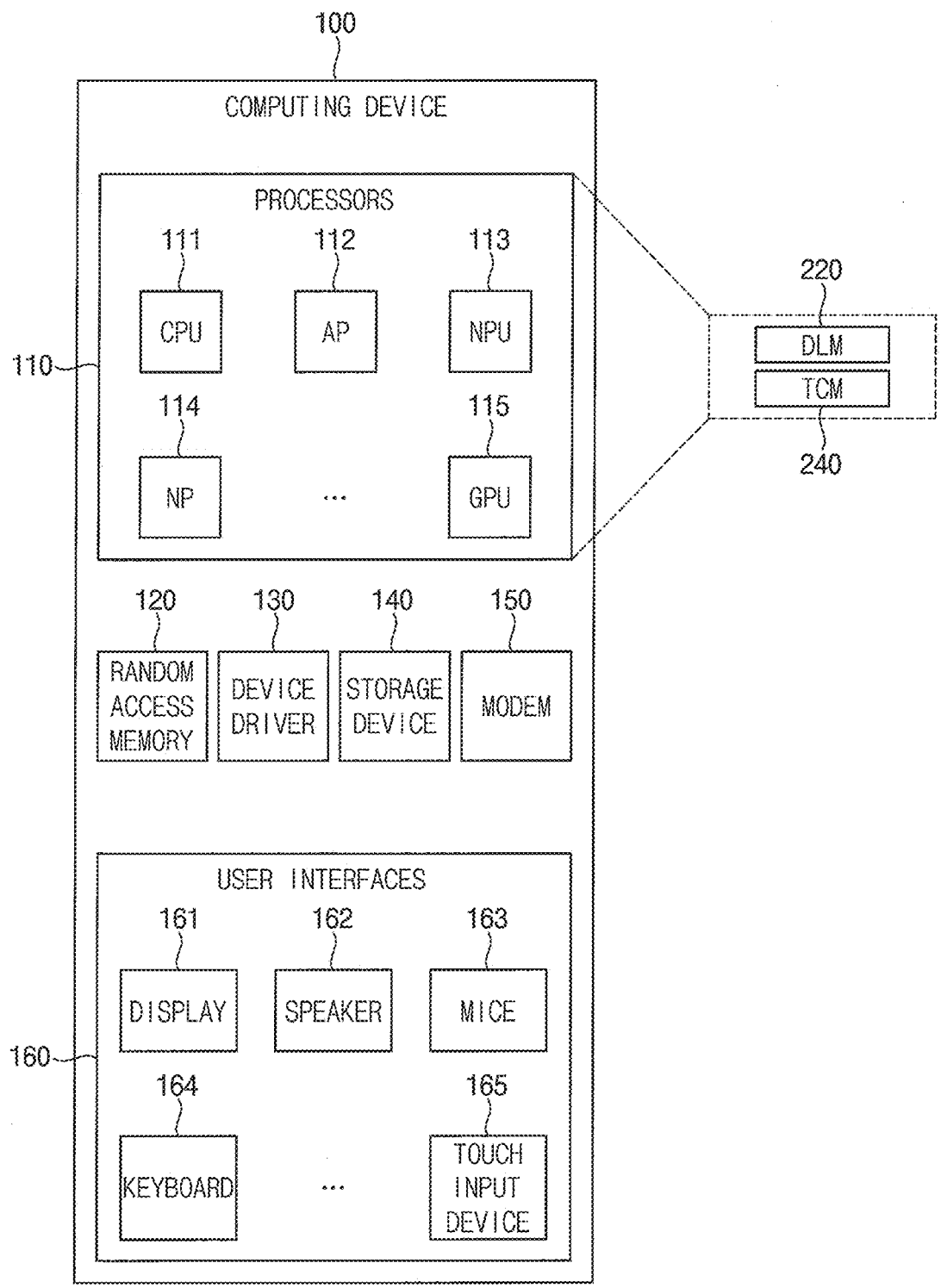
FIG. 2 is a block diagram illustrating a computing device according to some example embodiments.

FIG. 2 is a block diagram illustrating a computing device according to some example embodiments.

Referring to FIG. 2, a computing device 100 may include processors 110, a random access memory 120, a device driver 130, a storage device 140, a modem 150, and a user interface 160.

At least one processor of the processors 110 may be configured to operate a deep learning module DLM 220 and a training control module TCM 240. The training control module 240 may perform the method of FIG. 1 to train the deep learning model 220.

In some example embodiments, the deep learning model 220 and the correction module 240 may be implemented as instructions (and/or program codes) that may be executed by the at least one of the processors 110. The instructions (and/or program codes) of the deep learning model 220 and the training control module 240 may be stored in computer readable media. For example, the at least one processor may load (and/or read) the instructions to (and/or from) the random access memory 120.

In some example embodiments, the at least one processor may be manufactured to efficiently execute instructions included in the deep learning model 220 and the training control module 240. For example, the at least one processor may be a dedicated processor that is implemented (e.g., in hardware) based on the deep learning model 220 and the training control module 240. The at least one processor may efficiently execute instructions from various machine learning modules. In some embodiments, at least one processor may receive information corresponding to the deep learning model 220 and the training control module 240 to operate the deep learning model 220 and the training control module 240.

The processors 110 may include, for example, at least one general-purpose processor such as a central processing unit ("CPU") 111, an application processor ("AP") 112, and/or other processing units. In addition, the processors 110 may include at least one special-purpose processor such as a neural processing unit ("NPU") 113, a neuromorphic processor ("NP") 114, a graphic processing unit GPU 115, etc. For example, the processors 110 may include two or more heterogeneous processors. Though illustrated as including the CPU 111, AP 112, NPU 113, NP 114, and GPU 115, the example embodiments are not so limited. For example, the processors 110 may include more or fewer processors than illustrated.

The random access memory 120 may be used as an operation memory of the processors 110, a main memory, and/or a system memory of the computing device 100. The random access memory 120 may include a volatile memory such as a dynamic random access memory (DRAM), a static random access memory (SRAM), and/or the like. Additionally (and/or alternatively), the random access memory 120 may include a nonvolatile memory such as a phase-change random access memory (PRAM), a ferroelectrics random access memory (FRAM), a magnetic random access memory (MRAM), a resistive random access memory (RRAM), and/or the like.

The device driver 130 may control peripheral circuits such as the storage device 140, the modem 150, the user interface 160, etc., according to requests of the processors 110. The storage device 140 may include a fixed storage device such as a hard disk drive, a solid state drive (SSD), etc., and/or include (and/or be connected to) an attachable storage device such as an external hard disk drive, an external SSD, a memory card, and/or other external storage.

The modem 150 may perform wired or wireless communication with external devices through various communication methods and/or communication interface protocols such as Ethernet, WiFi, LTE, a third generation communication system such as code division multiple access (CDMA), global system for mobile communications (GSM), north American digital cellular (NADC), extended-time division multiple access (E-TDMA), and/or wide band code division multiple access (WCDMA), a fourth generation communication system such as 4G LTE, a fifth generation communication system such as 5G mobile communication, and/or other communication methods.

The user interface 160 may receive information from a user and provide information to the user. The user interface 160 may include at least one output interface such as a display 161, a speaker 162, etc., and may further include at least one input interface such as mice (mouse) 163, a keyboard 164, a touch input device 165, etc. Though illustrated as including the display 161, the speaker 162, the mouse, 163, the keyboard 164, and the touch input device 165, the example embodiments are not so limited, and may, e.g., include more or fewer elements. In some example embodiments, for example, some of the user interfaces 160 may be combined (e.g., to include a touch screen).

In some example embodiments, the deep learning model 220 and the training control module 240 may receive the instructions (and/or codes) through the modem 150 and store the instructions in the storage device 150. In some example embodiments, the instructions of the deep learning model 220 and the training control module 240 may be stored in an attachable storage device and the attachable storage device may be connected to the computing device 100 by a user. The instructions of the deep learning model 220 and the training control module 240 may be loaded in the random access memory 120 for rapid execution of the instructions.

In some example embodiments, at least one of the computer program codes, the compact model, the deep learning model and/or the training control module may be stored in a transitory and/or non-transitory computer-readable medium. In some example embodiments, values resulting from a simulation performed by the processor and/or values obtained from arithmetic processing performed by the processor may be stored in a transitory and/or non-transitory computer-readable medium. In some example embodiments, intermediate values generated during deep learning may be stored in a transitory and/or non-transitory computer-readable medium. In some example embodiments, at least one of the training data, the process data, the device data, the simulation result data, the prediction data, and/or the uncertainty data may be stored in a transitory or non-transitory computer-readable medium. However, the example embodiments are not limited thereto.

Figure 3:
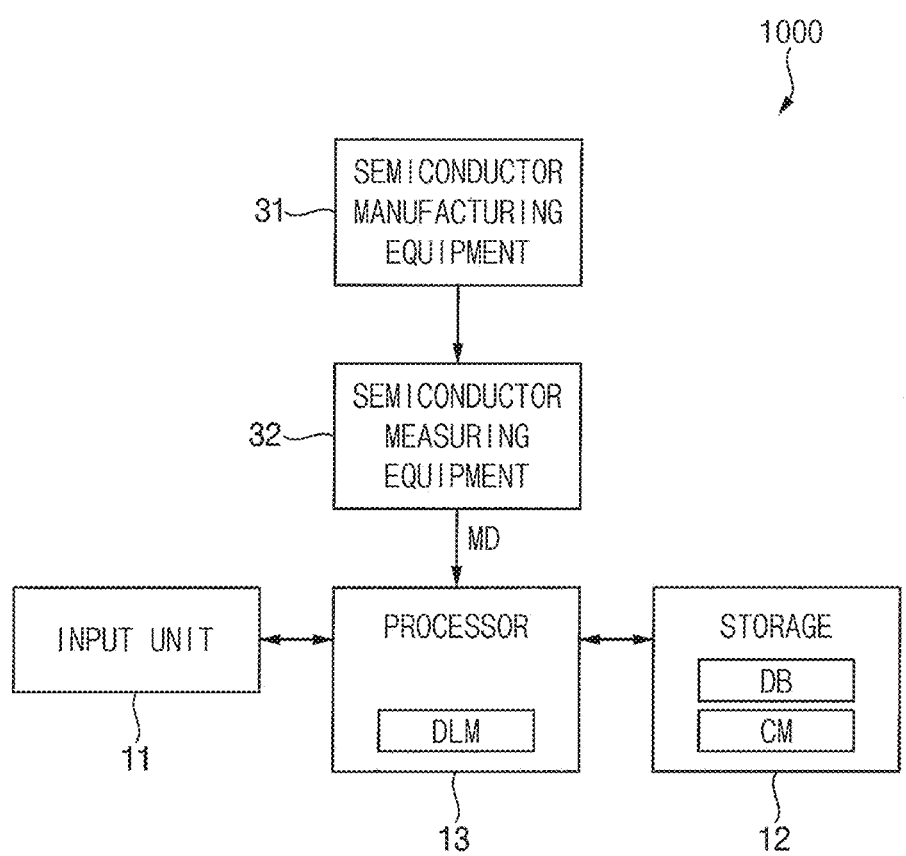
FIG. 3 is a block diagram electronic device according to some example embodiments.

FIG. 3 is a block diagram electronic device according to example embodiments.

Referring to FIG. 3, an electronic device 1000 may include an input unit 11, a storage 12, and a processor 13. The storage 12 may include a compact model CM. The electronic device 1000, a semiconductor manufacturing equipment 31, and a semiconductor measuring equipment 32 may form a semiconductor system. In some example embodiments, the electronic device 1000 may be implemented as a semiconductor system separated from the semiconductor manufacturing equipment 31 and the semiconductor measuring equipment 32.

The input unit 11 may receive the device data and transmit the device data to processor 13, and the processor 13 may generate the basic training data using the compact model CM. The compact model CM may provide the simulation result data indicating the characteristics of the semiconductor device corresponding to the device data by performing simulation based on the device data. For example, in some example embodiments, the input unit 11 may be (and/or include) at least one of the user inputs, storage device 140, and/or modem 150, and the processor 13 may be (and/or include) at least one of the processors 100 (as illustrated in FIG. 1).

The processor 13 may generate the training data corresponding to a combination of the device data and the simulation result data. The processor 13 may obtain values of the simulation result data corresponding to various values of the device data and establish a database DB including various combinations of the values of the device data and the simulation result data. The established database DB may be stored in the storage 12, and the processor 13 may perform training or learning of the deep learning model DLM using the training data in the database DB.

The processor 13 may generate (and/or update) the compact model CM based on measurement data MD and store the compact model CM in the storage 12.

The compact model CM may be generated (and/or updated) based on the measurement data MD. The measurement data MD may include an electrical and/or structural characteristic of a semiconductor product actually measured by the semiconductor measuring equipment 32. The semiconductor product measured by the semiconductor measuring equipment 32 may have been manufactured by the semiconductor manufacturing equipment 31 based on semiconductor manufacturing data. The semiconductor manufacturing data may be related to a manufacture of a target semiconductor device and/or a manufacture of a semiconductor device similar to the target semiconductor device.

The compact model CM may be updated in response to the measurement of an electrical and/or structural characteristic of a semiconductor product by the semiconductor measuring equipment 32. For example, in response to the reception of the measurement data MD from the semiconductor measuring equipment 32, the processor 13 may update the compact model CM to reflect the latest measurement data MD. The processor 13 may receive the measurement data MD from the semiconductor measuring equipment 32 through the input unit 11 or a communication unit.

The storage 12 may include equipment information of at least one selected from the semiconductor manufacturing equipment 31 and/or the semiconductor measuring equipment 32. For example, a semiconductor product may have a different electrical and/or structural characteristic according to the type of the semiconductor manufacturing equipment 31. In addition, the electrical and/or structural characteristic of a semiconductor product may be differently measured according to the type of the semiconductor measuring equipment 32. To reduce the potential for errors involved in the types of the semiconductor manufacturing equipment 31 and the semiconductor measuring equipment 32, the storage 12 may include various kinds of equipment information such as information about a manufacturer of the semiconductor manufacturing equipment 31 and/or a manufacturer of the semiconductor measuring equipment 32, model information of the semiconductor manufacturing equipment 31 and the semiconductor measuring equipment 32, and/or performance information thereof. The processor 13 may update the compact model CM with reference to the equipment information stored in the storage 12.

The processor 13 may use deep learning model DLM, the compact model CM, and/or the database DB to simulate and/or predict the performance of a semiconductor device manufactured by the semiconductor manufacturing equipment 31, e.g., before the semiconductor device is manufactured. The processor 13 may, for example, determine whether a change to the design of the semiconductor device may improve or deteriorate the performance of the semiconductor device based on, e.g., operational conditions for the semiconductor device. In some example embodiments, for example, the processor 13 may confirm a design based on these predictions thereby indicating that the design is okay to proceed to manufacturing and/or forwarding the design to a processor controlling the semiconductor manufacturing equipment 31. The semiconductor manufacturing equipment 31 may then manufacture a semiconductor device based on the confirmed design. The processor 13 may also pause (and/or stop) the production of semiconductor devices based on the design if, e.g., the change in the design would result in a characteristic of the semiconductor devices deteriorating below a threshold value. In some example embodiments a warning and/or a representation of how and/or what characteristics are affected by the change in the design may be provided to a user (e.g., on the display 161 and/or through the modem 150 of FIG. 2).

In some example embodiments, the processor 13 may also (e.g., periodically) confirm the prediction of the deep learning model DLM by comparing the prediction of a design with a semiconductor device manufactured based on the design, e.g., by using the measurement data MD received from the semiconductor measuring equipment 32 and/or using a data uncertainty value, as discussed below. For example, in some example embodiments, the processor 13 may store the prediction in the storage 12, and then may compare the prediction to the semiconductor device manufactured based on the design. If the prediction and the manufactured semiconductor device differ, e.g., beyond a maximum threshold, the compact model CM stored in the storage 12 may be, e.g., updated based on the measurement data MD actually measured by the semiconductor measuring equipment 32, as discussed above.

Figure 4:
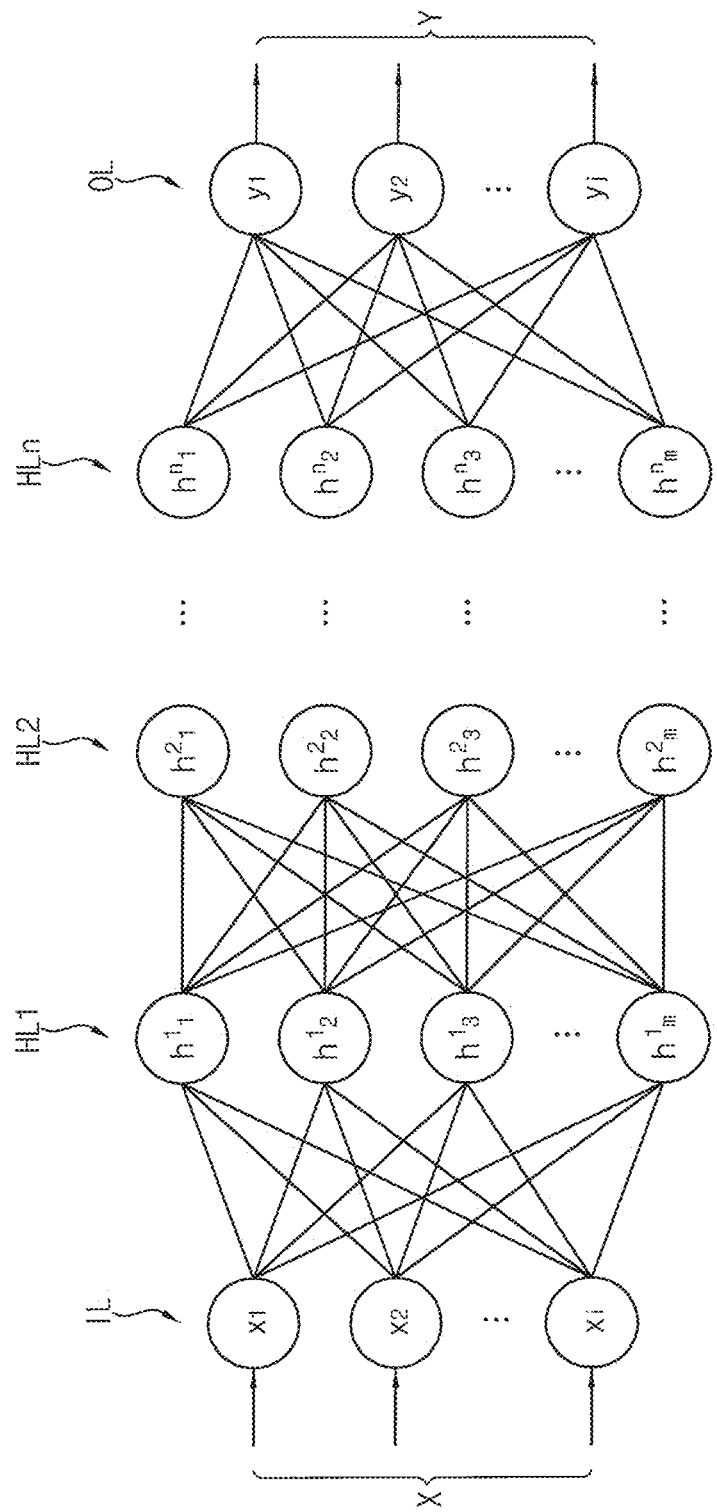
FIGS. 4 and 5 are diagrams for describing examples of a deep learning neural network structure that is driven by a machine learning device according to some example embodiments.
Figure 5:
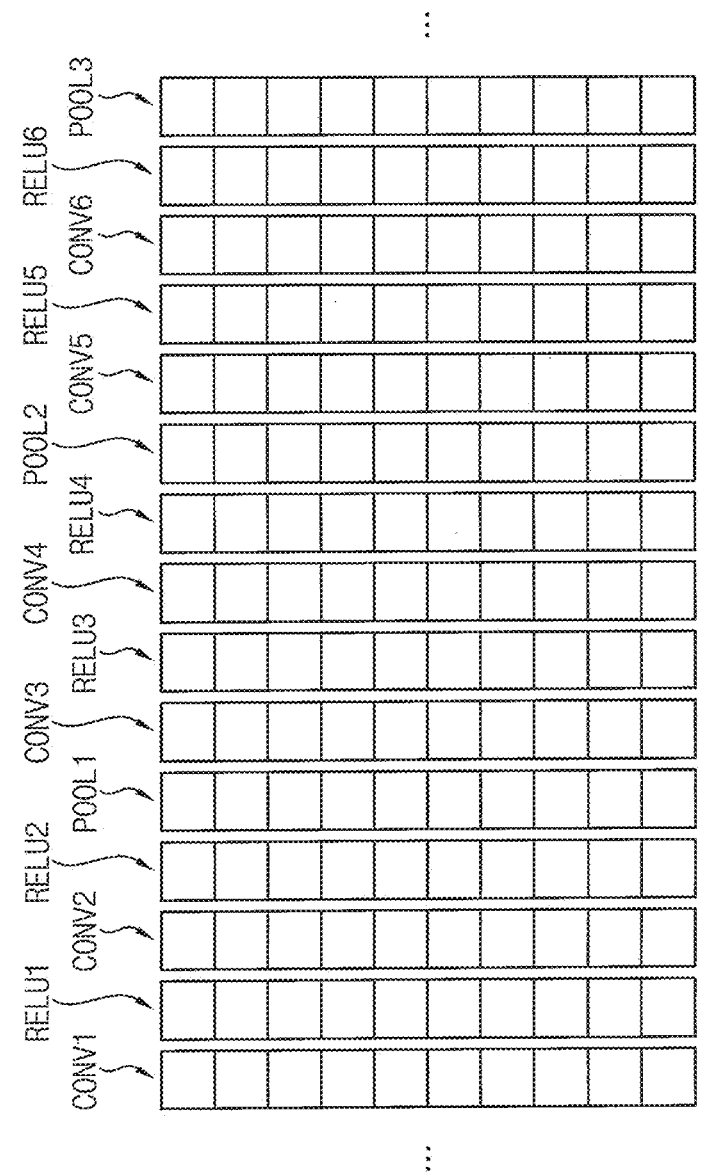

FIGS. 4 and 5 are diagrams for describing examples of a deep learning neural network structure that is driven by a machine learning device according to example embodiments.

Referring to FIG. 4, a general neural network may include an input layer IL, a plurality of hidden layers HL1, HL2, HLn and an output layer OL.

The input layer IL may include i input nodes x1, x2, . . . , xi, where i is a natural number. Input data (e.g., vector input data) X whose length is i may be input to the input nodes x1, x2, . . . , xi such that each element of the input data X is input to a respective one of the input nodes x1, x2, . . . , xi.

The plurality of hidden layers HL1, HL2, ..., HLn may include n hidden layers, where n is a natural number, and may include a plurality of hidden nodes $h^1_1, h^1_2, h^1_3, \ldots, h^1_m, h^2_1, h^2_2, h^2_3, \ldots, h^2_m, h^n_1, h^n_2, h^n_3, \ldots, h^n_m$. For example, the hidden layer HL1 may include m hidden nodes $h^1_1, h^1_2, h^1_3, \ldots, h^1_m$, the hidden layer HL2 may include m hidden nodes $h^2_1, h^2_2, h^2_3, \ldots, h^2_m$, and the hidden layer HLn may include m hidden nodes $h^n_1, h^n_2, h^n_3, \ldots, h^n_m$, where m is a natural number.

The output layer OL may include j output nodes y1, y2, ..., yj, providing output data Y where j is a natural number. The output layer OL may output the output data Y associated with the input data X.

A structure of the neural network illustrated in FIG. 4 may be represented by information on branches (or connections) between nodes illustrated as lines, and a weighted value assigned to each branch. Nodes within one layer may not be connected to one another, but nodes of different layers may be fully (and/or partially) connected to one another.

Each node (e.g., the node $h^1_1$) may receive an output of a previous node (e.g., the node $x_1$), may perform a computing operation, computation and/or calculation on the received output, and may output a result of the computing operation, computation, or calculation as an output to a next node (e.g., the node $h^2_1$). Each node may calculate a value to be output by applying the input to a specific function, e.g., a nonlinear function.

Generally, the structure of the neural network may be set in advance, and the weighted values for the connections between the nodes are set appropriately using data having an already known answer of which class the data belongs to. The data with the already known answer may be referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 4 may not be suitable for handling input image data (or input sound data) because each node (e.g., the node $h^1_1$) is connected to all nodes of a previous layer (e.g., the nodes x1, x2, ..., xi included in the layer IL) and then the number of weighted values drastically increases as the size of the input image data increases. Thus, a convolutional neural network (CNN), which is implemented by combining the filtering technique with the general neural network, has been researched such that two-dimensional image (e.g., the input image data) is efficiently trained by the convolutional neural network.

Referring to FIG. 5, a convolutional neural network may include a plurality of layers CONV1, RELU1, CONV2, RELU2, POOL1, CONV3, RELU3, CONV4, RELU4, POOL2, CONV5, RELU5, CONV6, RELU6, POOL3 and FC.

Unlike the general neural network, each layer of the convolutional neural network may have three dimensions of width, height, and depth, and thus data that is input to each layer may be volume data having three dimensions of width, height, and depth.

Each of convolutional layers CONV1, CONV2, CONV3, CONV4, CONV5 and CONV6 may perform a convolutional operation on input volume data. In an image processing, the convolutional operation represents an operation in which image data is processed based on a mask with weighted values and an output value is obtained by multiplying input values by the weighted values and adding up the total multiplied values. The mask may be referred to as a filter, window, and/or kernel.

In further detail, parameters of each convolutional layer may comprise (and/or include) a set of learnable filters. Every filter may be spatially small (e.g., along width and height), but may extend through the full depth of an input volume. For example, during the forward pass, each filter may be slid (e.g., convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32×32×3 passes through the convolutional layer CONV1 having four filters with zero-padding, output volume data of the convolutional layer CONV1 may have a size of 32×32×12 (e.g., a depth of volume data increases).

Each of the rectifying linear unit ("RELU") layers RELU1, RELU2, RELU3, RELU4, RELU5 and RELU6 may perform a rectified linear unit operation that corresponds to an activation function defined by, e.g., a function $f(x)=\max(0, x)$ (e.g., an output is zero for all negative input x). For example, if input volume data having a size of 32×32×12 passes through the RELU layer RELU1 to perform the rectified linear unit operation, output volume data of the RELU layer RELU1 may have a size of 32×32×12 (e.g., a size of volume data is maintained).

Each of pooling layers POOL1, POOL2 and POOL3 may perform a down-sampling operation on input volume data along spatial dimensions of width and height. For example, four input values arranged in a 2×2 matrix formation may be converted into one output value based on a 2×2 filter. For example, a maximum value of four input values arranged in a 2×2 matrix formation may be selected based on 2×2 maximum pooling, or an average value of four input values arranged in a 2×2 matrix formation may be obtained based on 2×2 average pooling. For example, if input volume data having a size of 32×32×12 passes through the pooling layer POOL1 having a 2×2 filter, output volume data of the pooling layer POOL1 may have a size of 16×16×12 (e.g., width and height of volume data decreases, and a depth of volume data is maintained).

Typically, one convolutional layer (e.g., CONV1) and one RELU layer (e.g., RELU1) may form a pair of CONV/RELU layers in the convolutional neural network, pairs of the CONV/RELU layers may be repeatedly arranged in the convolutional neural network, and the pooling layer may be periodically inserted in the convolutional neural network, thereby reducing characteristics of the input data X. The type and number of layers including in the convolution neural network may be changed variously.

Example embodiments of the deep learning model are not limited to a specific neural network. The deep learning model may include, for example, at least one of CNN (Convolution Neural Network), R-CNN(Region with Convolution Neural Network), RPN(Region Proposal Network), RNN(Recurrent Neural Network), S-DNN(Stacking-based deep Neural Network), S-SDNN(State-Space Dynamic Neural Network), Deconvolution Network, DBN (Deep Belief Network), RBM (Restricted Boltzmann Machine), Fully Convolutional Network, LSTM (Long Short-Term Memory) Network, Classification Network and BNN (Bayesian Neural Network). Additionally (and/or alternatively), the deep learning model(s) may be trained based on at least one of various algorithms such as regression, linear and/or logistic regression, random forest, a support vector machine (SVM), and/or other types of models, such as statistical clustering, Bayesian classification, decision trees, dimensionality reduction such as principal component analysis, expert systems, and/or combinations thereof including ensembles such as random forests.

Figure 6:
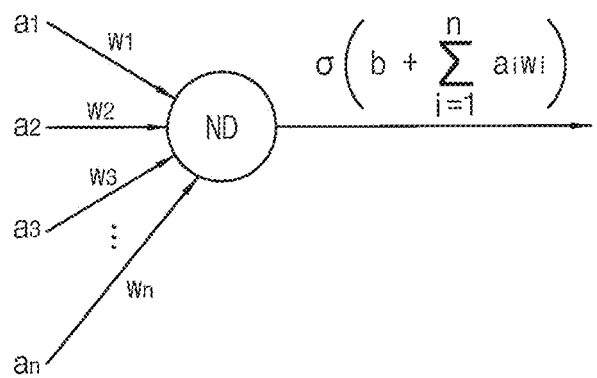
FIG. 6 is a diagram illustrating an example of a node included in a neural network.

FIG. 6 is a diagram illustrating an example of a node included in a neural network FIG. 6 illustrates an example node operation performed by a node ND in a neural network. When N inputs a1~an are provided to the node ND, the node ND may multiply the n inputs a1~an and corresponding n weights w1~wn, respectively, may sum n values obtained by the multiplication, may add an offset "b" to a summed value, and may generate one output value by applying a value to which the offset "b" is added to a specific function "σ". The learning operation may be performed based on the training data to update all nodes in the neural network.

In case of prediction of characteristics of a semiconductor device based on deep learning, a sufficient amount of training data and/or learning data may be utilized in (and/or required for) training of a deep learning model or deep learning module. For example, tens through millions of training data of various kinds may be required to prevent over-fitting during training and enhance performance of the deep learning model. According to some example embodiments, the database for training the deep learning model may be established efficiently by generating the training data using the compact model.

Figure 7:
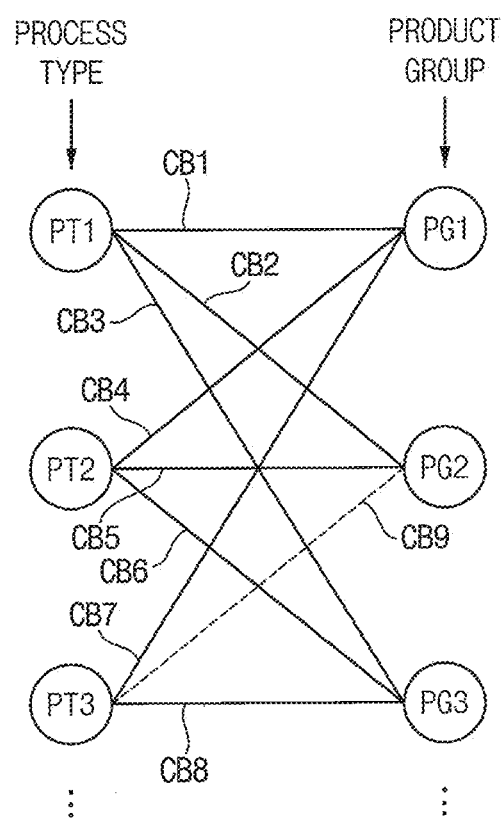

FIGS. 7 and 8 are diagrams for describing relationship between a plurality of semiconductor products and a target semiconductor product in a method of predicting characteristics of semiconductor device according to some example embodiments.

Referring to FIGS. 7 and 8, the process data PR may be determined depending on a process-group combination PGC of a process type PT indicating a manufacturing process of each semiconductor product SP and a product group PG in which each semiconductor product SP is included. For example, the process type PT may indicate a critical dimension (CD) of the manufacturing process. The product group PG may include a server product group, a mobile product group, a graphic product group, a high bandwidth memory product group, and so on.

A first semiconductor product SP1 may correspond to a first process-product combination CB1 of a first process type PT1 and a first product group PG1, and the process data PR of the first semiconductor product SP1 may be determined as first process data PR1. A second semiconductor product SP2 may correspond to a second process-product combination CB2 of the first process type PT1 and a second product group PG2, and the process data PR of the second semiconductor product SP2 may be determined as second process data PR2. A third semiconductor product SP3 may correspond to a third process-product combination CB3 of the first process type PT1 and a third product group PG3, and the process data PR of the third semiconductor product SP3 may be determined as third process data PR3.

A fourth semiconductor product SP4 may correspond to a fourth process-product combination CB4 of a second process type PT2 and the first product group PG1, and the process data PR of the fourth semiconductor product SP4 may be determined as fourth process data PR4. A fifth semiconductor product SP5 may correspond to a fifth process-product combination CB5 of the second process type PT2 and the second product group PG2, and the process data PR of the fifth semiconductor product SP5 may be determined as fifth process data PR5. A sixth semiconductor product SP6 may correspond to a sixth process-product combination CB6 of the second process type PT2 and the third product group PG3, and the process data PR of the sixth semiconductor product SP6 may be determined as sixth process data PR6.

A seventh semiconductor product SP7 may correspond to a seventh process-product combination CB7 of a third process type PT3 and the first product group PG1, and the process data PR of the seventh semiconductor product SP7 may be determined as seventh process data PR7. An eighth semiconductor product SP8 may correspond to an eighth process-product combination CB8 of the third process type PT3 and the third product group PG3, and the process data PR of the eighth semiconductor product SP8 may be determined as eighth process data PR8.

The measurement data MD may be provided with respect to each of the first through eighth semiconductor products SP1-SP8 as described with reference to FIG. 3, and first through eighth compact models CM1-CM8 respectively corresponding to the first through eighth semiconductor products SP1-SP8 may be generated. The above-described basic training data may be generated using the first through eighth compact models CM1-CM8. The first through eighth semiconductor products SP1-SP8 may be the previous or established semiconductor products ESP, that is, the plurality of semiconductor products described with reference to FIG. 1.

A ninth semiconductor product SP9 may correspond to a ninth process-product combination CB9 of the third process type PT3 and the second product group PG2, and the process data PR of the ninth semiconductor product SP9 may be determined as ninth process data PR9.

The ninth semiconductor product SP9 may be in a stage of designing in which a compact model corresponding to the ninth semiconductor product SP9 is not generated yet, whereas the first through eighth semiconductor products SP1-SP8 have the established compact models CM1-CM8.

As such, the process data PR may be determined depending on the process-group combination PGC of the process type PT indicating the manufacturing process of each semiconductor product SP and the product group PG in which each semiconductor product SP is included, and the process-group combination (e.g., the ninth process-group combination CB9) of the target semiconductor product (e.g., the ninth semiconductor product SP9) may be a new process-group combination that is not included in the process-group combinations (e.g., the first through eighth process-group combinations CB1-CB8) of the plurality of previous semiconductor products (e.g., the first through eight semiconductor products SP1-SP8). For example, the target semiconductor product (e.g., the ninth semiconductor product SP9) may be a new semiconductor product that is not included in the plurality of previous semiconductor products (e.g., the first through eighth semiconductor products SP1-SP8) respectively corresponding to the plurality of established compact models (CM1-CM8).

The compact models are configured to provide the characteristics of semiconductor devices within the range of the device data required for designing. In general, the test element groups are disposed scribe lanes of a wafer to provide the measurement data for generating the compact models. However, there exists a time increase and difficulty in securing coverage of data range to generate the compact modes, due to the limited area of the scribe lanes, process turn-around-time (TAT), and so on.

According to some example embodiments, the characteristics of the semiconductor device included in the target semiconductor product (e.g., the ninth semiconductor product SP9) may be provided efficiently and rapidly by providing the database of the basic training data for training the deep learning model using the established compact models (e.g., the first through eight compact models CM1-CM8) of the previously developed semiconductor products (e.g., the first through eighth semiconductor products SP1-SP8) with the process data and the device data as the input of the deep learning model.

The plurality of previous semiconductor products and the target semiconductor product may be memory devices. Some example embodiments are particularly useful in predicting the characteristics of the memory devices. In the memory business, the design technology co-optimization (DTCO) becomes more significant, e.g., providing device models rapidly for designing memory devices of next generations. In addition, the identical and/or similar semiconductor devices of the previous generation are used as the shrunken form in the next generation with respect to the memory devices, and thus the database for a new memory device may be efficiently established using the established compact models of the previous memory devices.

Figure 9:
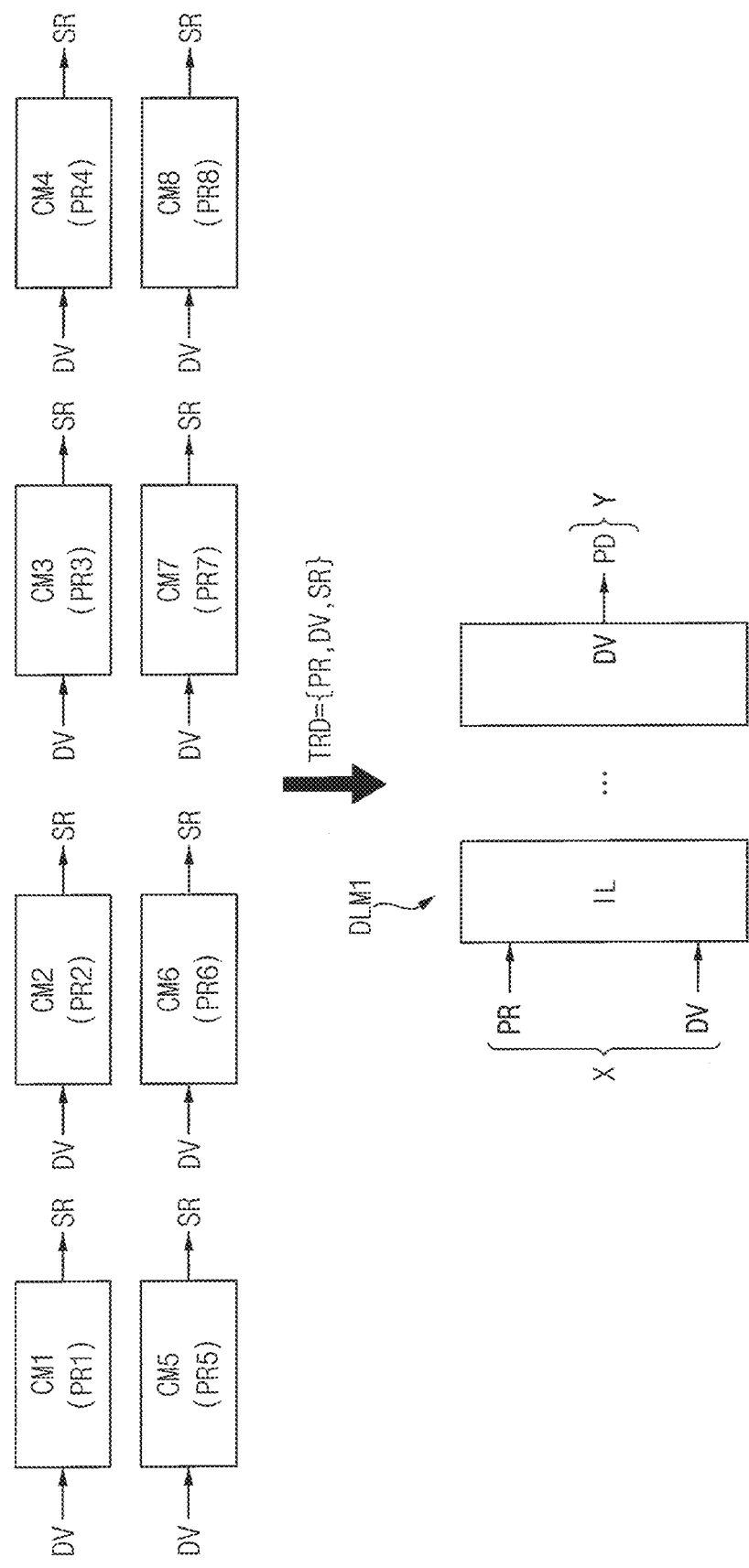
FIG. 9 is a diagram illustrating an example of a deep learning model in a method of predicting characteristics of semiconductor device according to some example embodiments.

FIG. 9 is a diagram illustrating an example of a deep learning model in a method of predicting characteristics of semiconductor device according to some example embodiments. For convenience of illustration, detailed configuration of a deep learning model is omitted and an input layer IL receiving input data X and an output layer OL providing output data Y are illustrated in FIG. 9.

The compact model may provide simulation result data SR indicating characteristics of a semiconductor device corresponding to device data DV by performing simulation based on the device data DV. In general, each compact model may be designed to output the simulation result data SR corresponding to process data associated a specific semiconductor product.

Referring to FIG. 9, deep learning model DLM1 may be generated, which may replace a plurality of compact models CM1~CM8 respectively corresponding to a plurality of process data PR1~PR8.

The basic training data TRD may be generated using the plurality of compact models CM1~CM8 such that the basic training data TRD correspond to a combination of process data PR, device data DV, and simulation result data SR. A plurality of basic training data TRD corresponding to different combinations may be generated based on different values of the process data PR and the device data DV.

In the example of FIG. 9, the input data X of the deep learning model DLM1 may include both of the process data PR1 and the device data DV. The output data Y may include the prediction data PD indicating the characteristics of the semiconductor device. The supervised learning of the deep learning model MLM1 may be performed using the simulation result data SR as the ground-truth data with respect to the process data PR and the device data DV.

FIG. 10 is a diagram illustrating data in a method of predicting characteristics of semiconductor device according to some example embodiments. FIG. 10 illustrates example data when a semiconductor device corresponds to a transistor. However, the example embodiments are not limited to a transistor and may be applied to semiconductor devices of other types.

Referring to FIG. 10, input data X of a deep learning model may include both of device data DV and process data PR.

The device data DV may indicate structure and operation condition of the semiconductor device. For example, the device data DV may include information on the structure of the semiconductor device such as a width W of a transistor, a length L of the transistor, and so on. In addition, the device data DV may include information of the operation condition of the semiconductor device such as an operation temperature Top of the transistor, a drain voltage Vd, a gate voltage Vg, a body voltage Vb, a source voltage Vs of the transistor, and so on.

The process data PR may indicate condition of manufacturing process of the semiconductor device. For example, the process data PR may include a kind Dk of a dopant in an ion-implanting process, a density Dd of the dopant, an activation temperature Tact, a thickness tOG of a gate oxide layer, a thickness of a spacer tSP in a gate structure of the transistor, and so on.

Output data Y of the deep learning model may include prediction data PD as illustrated in FIG. 9. In some example embodiments, as will be described below with reference to FIGS. 11 through 13, the output data Y of the deep learning model may include uncertainty data UC in addition to the prediction data PD.

The prediction data PD may indicate electrical characteristics of the semiconductor device. For example, the prediction data PD may include a threshold voltage Vt, a gain G, a breakdown voltage Vbk, a drain current Id of the transistor, and so on.

The uncertainty data UC may indicate uncertainty of the prediction data PD. The uncertainty data UC may include a model uncertainty value Um and/or a data uncertainty value Ud. As will be described below, the model uncertainty value Um may indicate the uncertainty of the prediction data PD caused by insufficiency of the basic training data, and the data uncertainty value Ud may indicate the uncertainty of the prediction data PD caused by noises of the basic training data.

Figure 11:
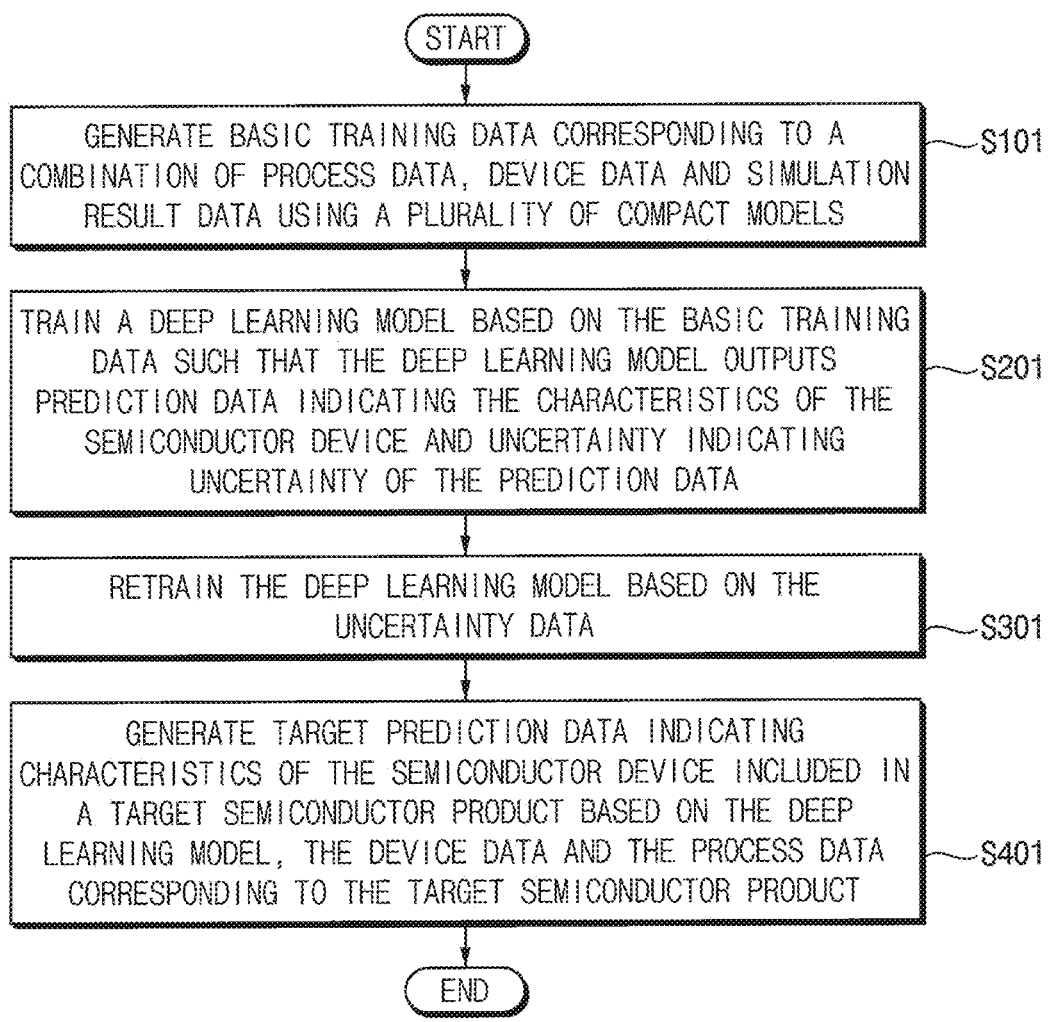
FIG. 11 is a flowchart illustrating a method of predicting characteristics of semiconductor device according to some example embodiments.

FIG. 11 is a flowchart illustrating a method of predicting characteristics of semiconductor device according to some example embodiments. At least a portion of the method may be performed by executing program codes by at least one processor and the program codes may be stored in computer readable media.

Referring to FIG. 11, basic training data corresponding to a combination of process data, device data and simulation result data may be generated using a plurality of compact models (S101).

As described above with reference to FIGS. 7 and 8, the plurality of compact models may respectively correspond to a plurality of process data and a plurality of semiconductor products. As described above with reference to FIG. 8, each compact model corresponding to each process data and each semiconductor product may generate the simulation result data indicating characteristics of a semiconductor device corresponding to the device data by performing simulation based on the device data. As described above with reference to FIG. 10, the device data may indicate structure and operation condition of the semiconductor device and the process data may indicate condition of manufacturing process of the semiconductor device.

A deep learning model may be trained based on the basic training data such that the deep learning model outputs prediction data indicating the characteristics of the semiconductor device and uncertainty data indicating uncertainty of the prediction data (S201). The simulation result data and the prediction data may indicate electrical characteristics of the semiconductor device.

The deep learning model may be retrained based on the uncertainty data (S301).

In some example embodiments, as will be described below with reference to FIG. 14, a first retraining may be performed such that the deep learning model that has been trained based on the basic training data is further trained based on the model uncertainty value.

In some example embodiments, as will be described below with reference to FIG. 16, a second retraining may be performed such that the deep learning model that has been trained based on the basic training data is initialized, and the initialized deep learning model is trained based on the data uncertainty value.

In some example embodiments, as will be described below with reference to FIG. 18, whether to perform the first retraining may be determined based on the model uncertainty value, and when it is determined that the first retraining is not performed, whether to perform the second retraining may be determined based on the data uncertainty value.

In some example embodiments, as will be described below with reference to FIG. 19, whether to perform the first retraining and whether to perform the second retraining are determined independently of each other.

Target prediction data indicating characteristics of the semiconductor device included in a target semiconductor product may be generated based on the deep learning model, the device data and the process data corresponding to the target semiconductor product (S401). As described above with reference to FIGS. 7 and 8, the target semiconductor product may be a new semiconductor product that is not included in the plurality of semiconductor products corresponding to the plurality of compact models.

As such, the method and the computing device according to some example embodiments may efficiently predict the characteristics of the semiconductor device included in the new semiconductor product, by generating the basic training data including the process data using the established compact models corresponding to the previous semiconductor products and training the deep learning model based on the basic training data. In addition, the method and the computing device according to some example embodiments may provide the deep learning model capable of precisely predicting the characteristics of the semiconductor device by training the deep learning model to output the prediction data indicating the characteristics of the semiconductor device and the uncertainty data indicating the uncertainty of the prediction data and retraining the deep learning model based on the uncertainty data. In addition, the method and computing device according to some example embodiments may efficiently provide the deep learning model capable of precisely predicting the characteristics of the semiconductor device by determining the method of retraining the deep learning model based on the type of the uncertainty of the prediction data. Through the enhanced prediction performance of the deep learning model, the time and/or the cost of designing and manufacturing the semiconductor product including the semiconductor device and the performance of the semiconductor product may be enhanced.

Figure 12:
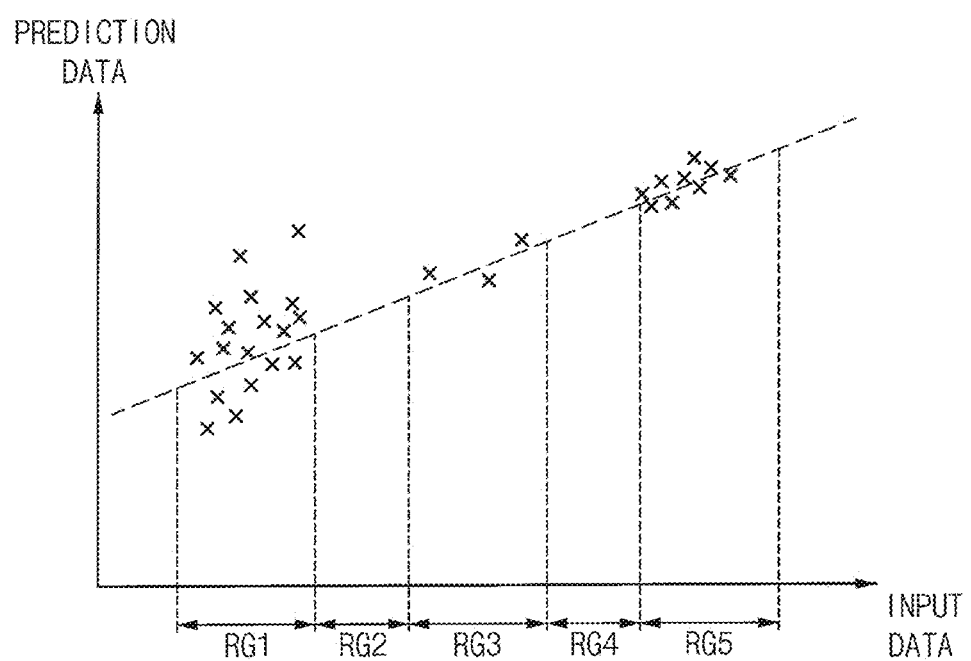
FIG. 12 is a diagram for describing types of uncertainty in a method of predicting characteristics of semiconductor device according to some example embodiments.

FIG. 12 is a diagram for describing types of uncertainty in a method of predicting characteristics of semiconductor device according to example embodiments.

In FIG. 12, the horizontal axis indicates input data of a deep learning model and the vertical axis indicates prediction data output from the deep learning model. FIG. 12 illustrates an example distribution of the prediction data provided using the deep learning model. The input data may be divided into first through fifth ranges RG1~RG5 according to the distribution of the prediction data.

For example, the prediction data indicating the characteristics of the semiconductor device may increase linearly according to the input data. In this case, the prediction data from an ideal deep learning model may coincide with a dotted line of a uniform slope in FIG. 12.

The prediction data have a relatively large distribution in the first range RG1 and have a relatively small distribution in the fifth range RG5.

The large distribution of the prediction data may be caused by noises of the input data and/or the training data. The uncertainty of the prediction data caused by noises of the training data may be referred to as data uncertainty (and/or aleatoric uncertainty).

In contrast, the uncertainty of the prediction data caused by insufficiency of the training data in the second and fourth ranges RG2 and RG4 may be referred to as model uncertainty (and/or epistemic uncertainty).

In some example embodiments, the uncertainty data output from the deep learning model may include a model uncertainty value indicating the uncertainty of the prediction data caused, e.g., by insufficiency of the basic training data. In these cases, as will be described below with reference to FIG. 14, a first retraining may be performed such that the deep learning model that has been trained based on the basic training data is further trained based on the model uncertainty value.

In some example embodiments, the uncertainty data output from the deep learning model may include a data uncertainty value indicating the uncertainty of the prediction data caused by noises of the basic training data. In these cases, as will be described below with reference to FIG. 16, a second retraining may be performed such that the deep learning model that has been trained based on the basic training data is initialized, and the initialized deep learning model is trained based on the data uncertainty value.

The deep learning model may be configured to output a model uncertainty value and a data uncertainty value through quantification of the model uncertainty and the data uncertainty.

In some example embodiments, the deep learning model may include Bayesian Neural Network (BNN). The deep learning model may quantize the uncertainty using the Monte-Carlo Dropout scheme, the Deep Ensemble scheme, a quantile regression scheme, a Gaussian Process Inference scheme, and/or combination thereof.

As such, the method and computing device according to some example embodiments may efficiently provide the deep learning model capable of precisely predicting the characteristics of the semiconductor device by determining the method of retraining the deep learning model based on the type of the uncertainty of the prediction data.

Figure 13:
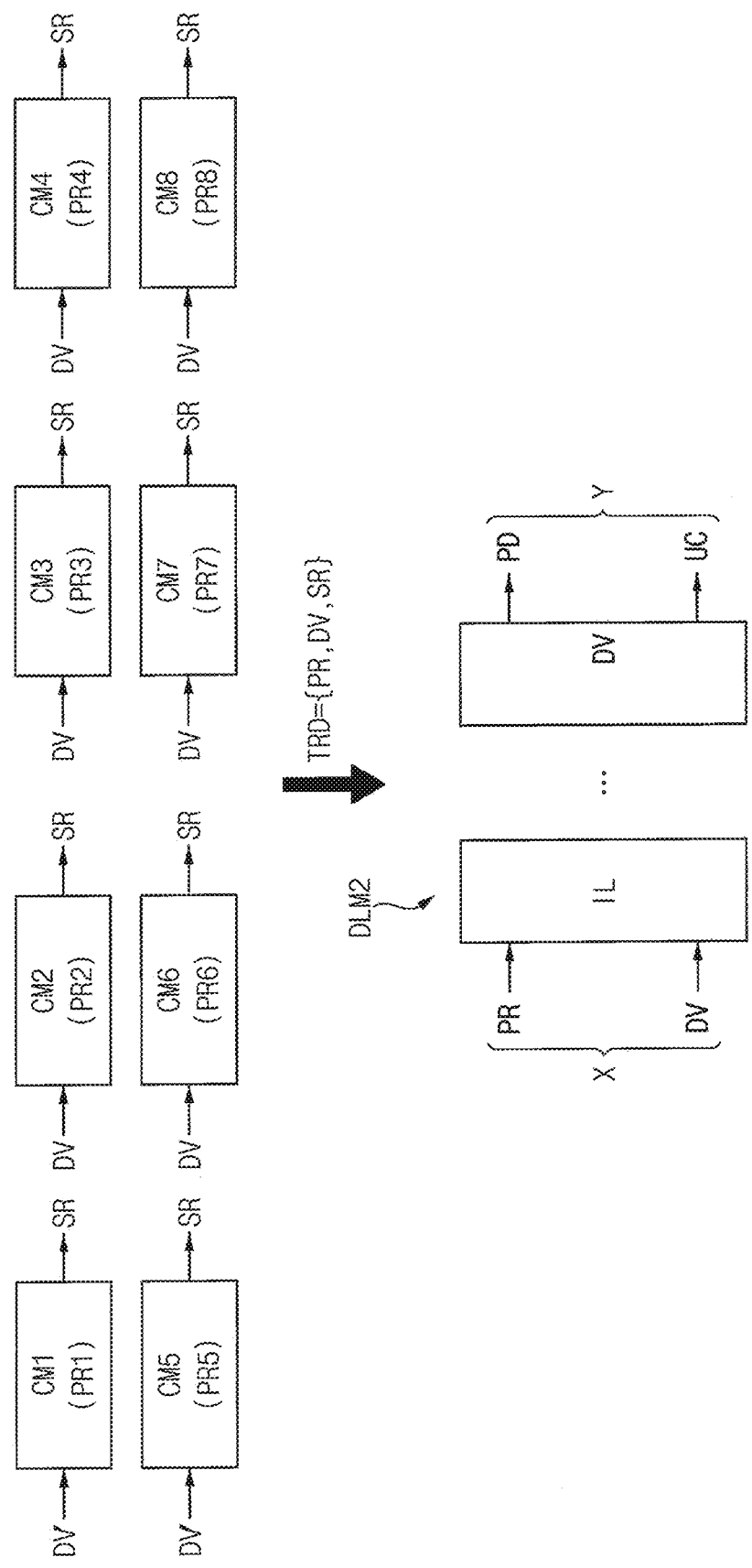
FIG. 13 is a diagram illustrating an example embodiment of a deep learning model in a method of predicting characteristics of semiconductor device according to some example embodiments.

FIG. 13 is a diagram illustrating an example embodiment of a deep learning model in a method of predicting characteristics of semiconductor device according to example embodiments.

Referring to FIG. 13, deep learning model DLM2 may be generated, which may replace a plurality of compact models CM1-CM8 respectively corresponding to a plurality of process data PR1-PR8.

The basic training data TRD may be generated using the plurality of compact models CM1-CM8 such that the basic training data TRD correspond to a combination of process data PR, device data DV and simulation result data SR. A plurality of basic training data TRD corresponding to different combinations may be generated based on different values of the process data PR and the device data DV.

In the example of FIG. 13, the input data X of the deep learning model DLM1 may include both of the process data PR1 and the device data DV. The output data Y may include the prediction data PD indicating the characteristics of the semiconductor device and the uncertainty data UC indicating the uncertainty of the prediction data PD. The supervised learning of the deep learning model MLM1 may be performed using the simulation result data SR as the ground-truth data with respect to the process data PR and the device data DV.

Figure 14:
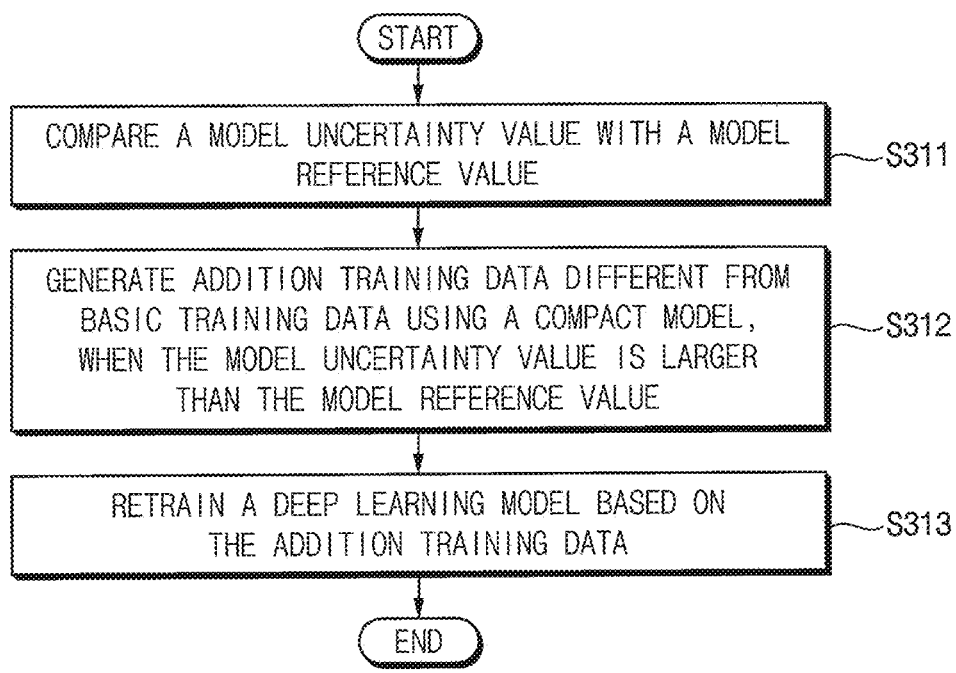
FIG. 14 is a flow chart illustrating an example embodiment of retraining based on model uncertainty value in a method of predicting characteristics of semiconductor device according to some example embodiments.
Figure 15:
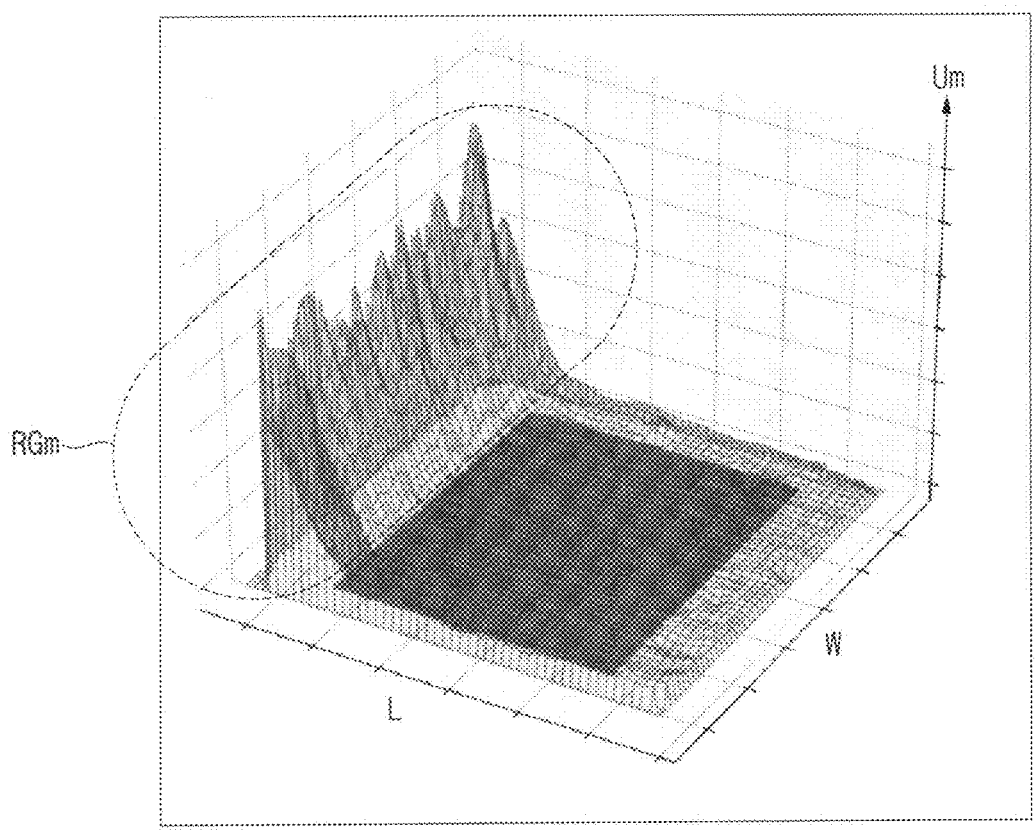
FIG. 15 is a diagram illustrating an addition data range in a method of predicting characteristics of semiconductor device according to some example embodiments.

FIG. 14 is a flow chart illustrating an example of retraining based on model uncertainty value in a method of predicting characteristics of semiconductor device according to some example embodiments, and FIG. 15 is a diagram illustrating an addition data range in a method of predicting characteristics of semiconductor device according to some example embodiments.

FIG. 14 illustrates a first retraining such that the deep learning model that has been trained based on the basic training data is further trained based on the model uncertainty value.

Referring to FIGS. 2 and 14, the training control module 240 operated by at least on processor of the processors 110 may compare the model uncertainty value with a model reference value (S311). As described above, the model uncertainty value may indicate the uncertainty of the prediction data caused by insufficiency of the basic training data. The model reference value may be determined as a proper value depending on target performance of the trained deep learning model.

When the model uncertainty value is larger than the model reference value, addition training data different from the basic training data may be generated using the compact model (S312). The training control module 240 may retrain the deep learning model based on the addition training data (S313). The training control module 240 may, for example, not initialize the deep learning model that has been trained based on the basic training data and retrain the deep learning model additionally based on the addition training data.

FIG. 15 illustrates an example distribution of the model uncertainty value provided from the trained deep learning model. In FIG. 15, the horizontal axes indicate the length L and the width W of a transistor and the vertical axis indicates the model uncertainty value Um.

The training control module 240 may determine an addition data range RGm corresponding to a range of data such that the model uncertainty value Um is larger than the model reference value. The training control module 240 may generate the addition training data such that the addition training data may correspond to a combination of the device data included in the addition data range and the corresponding simulation result data.

Figure 16:
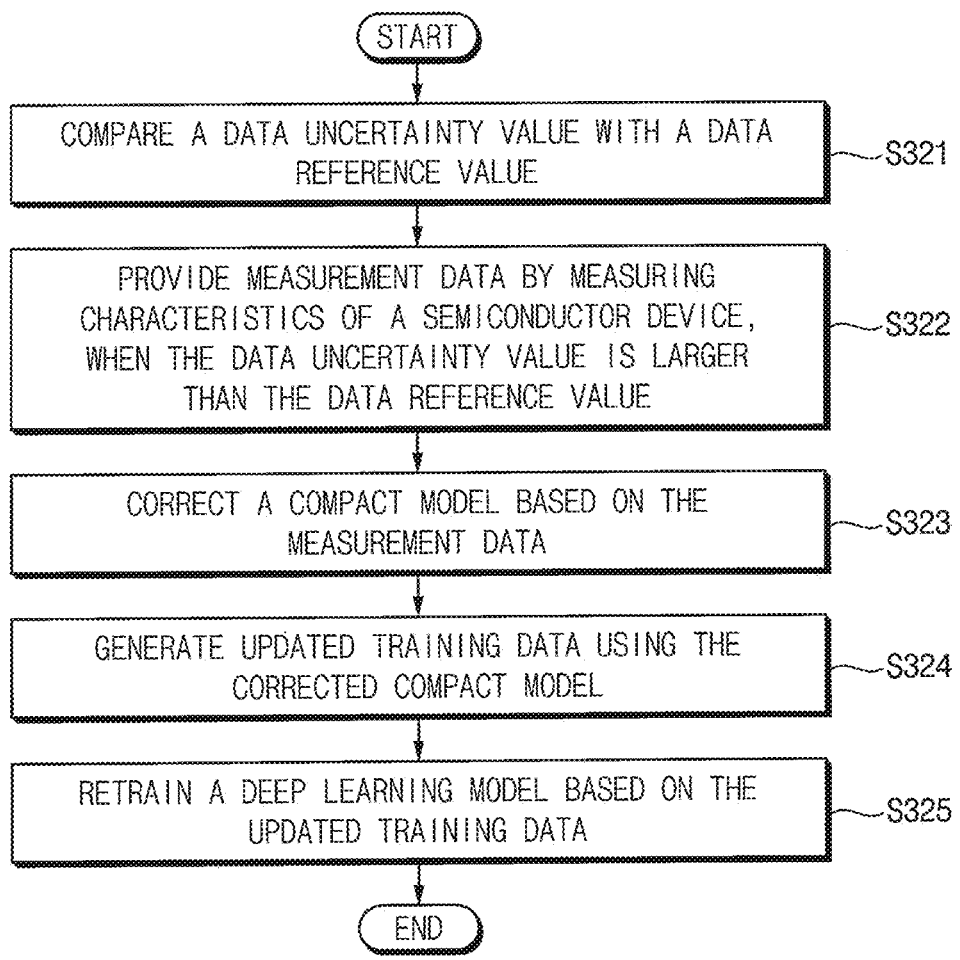
FIG. 16 is a flow chart illustrating an example embodiment of retraining based on data uncertainty value in a method of predicting characteristics of semiconductor device according to some example embodiments.
Figure 17:
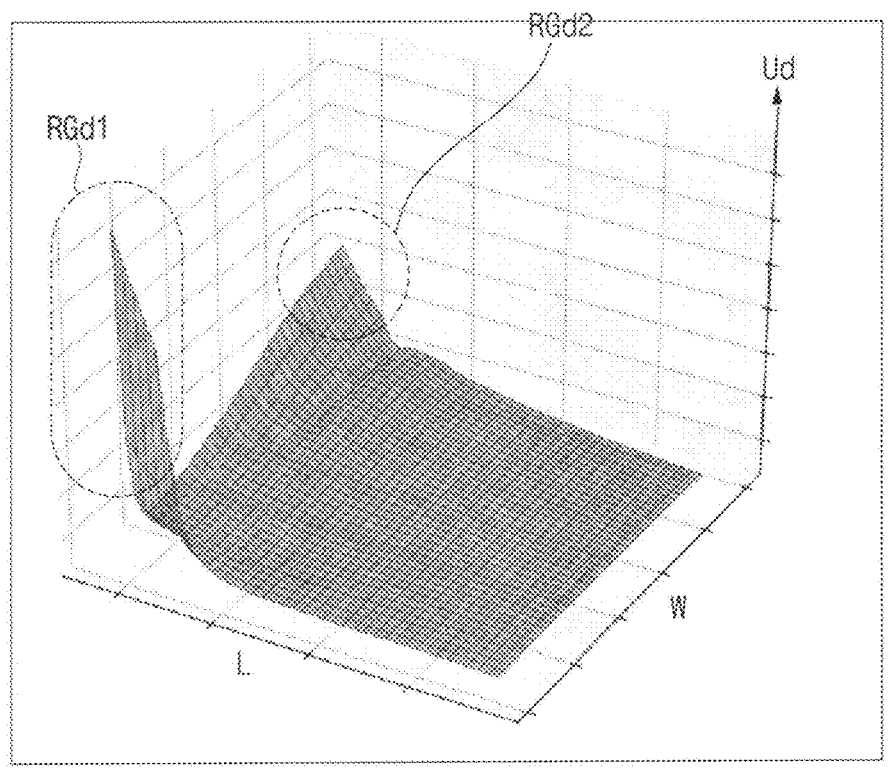
FIG. 17 is a diagram illustrating a measurement data range in method of predicting characteristics of semiconductor device according to some example embodiments.

FIG. 16 is a flow chart illustrating an example of retraining based on data uncertainty value in a method of predicting characteristics of semiconductor device according to some example embodiments, and FIG. 17 is a diagram illustrating a measurement data range in method of predicting characteristics of semiconductor device according to example embodiments.

FIG. 16 illustrates a second retraining such that the deep learning model that has been trained based on the basic training data is initialized, and the initialized deep learning model is trained based on the data uncertainty value.

Referring to FIGS. 2 and 16, the training control module 240 operated by at least on processor of the processors 110 may compare the data uncertainty value with a data reference value (S321). As described above, the data uncertainty value may indicate the uncertainty of the prediction data caused by noises of the basic training data. The data reference value may be determined as a proper value depending on target performance of the trained deep learning model.

When the data uncertainty value is larger than the data reference value, measurement data may be provided by measuring characteristics of the semiconductor device (S322), as described with reference to FIG. 3. The measurement data may be provided to the training control module 240.

The training control module 240 may correct the compact model based on the measurement data (S324) and generate updated training data using the corrected compact model (S324). The training control module 240 may retrain the deep learning model based on the updated training data (S325). The training control module 240 may initialize the deep learning model that has been trained based on the basic training data, and then retrain the initialized deep learning model based on the measurement training data. For example, weight values defining a starting point in the deep learning model may be set to small random values during a weight initialization process, thereby increasing the probability that the results of the deep learning model will converge.

FIG. 17 illustrates an example distribution of the data uncertainty value provided from the trained deep learning model. In FIG. 17, the horizontal axes indicate the length L and the width W of a semiconductor device (e.g., a transistor) and the vertical axis indicates the data uncertainty value Ud.

The training control module 240 may determine one or more measurement data ranges RGd1 and RGd2 corresponding to a range of data such that the data uncertainty value Ud is larger than the data reference value. The measurement data ranges RGd1 and RGd2 may be provided to the semiconductor manufacturing equipment 31 and the semiconductor measuring equipment 32 in FIG. 3, and the semiconductor manufacturing equipment 31 and the semiconductor measuring equipment 32 may provide the measurement data MD by measuring the characteristics of the semiconductor device corresponding to the device data included in the measurement data ranges RGd1 and RGd2.

Figure 18:
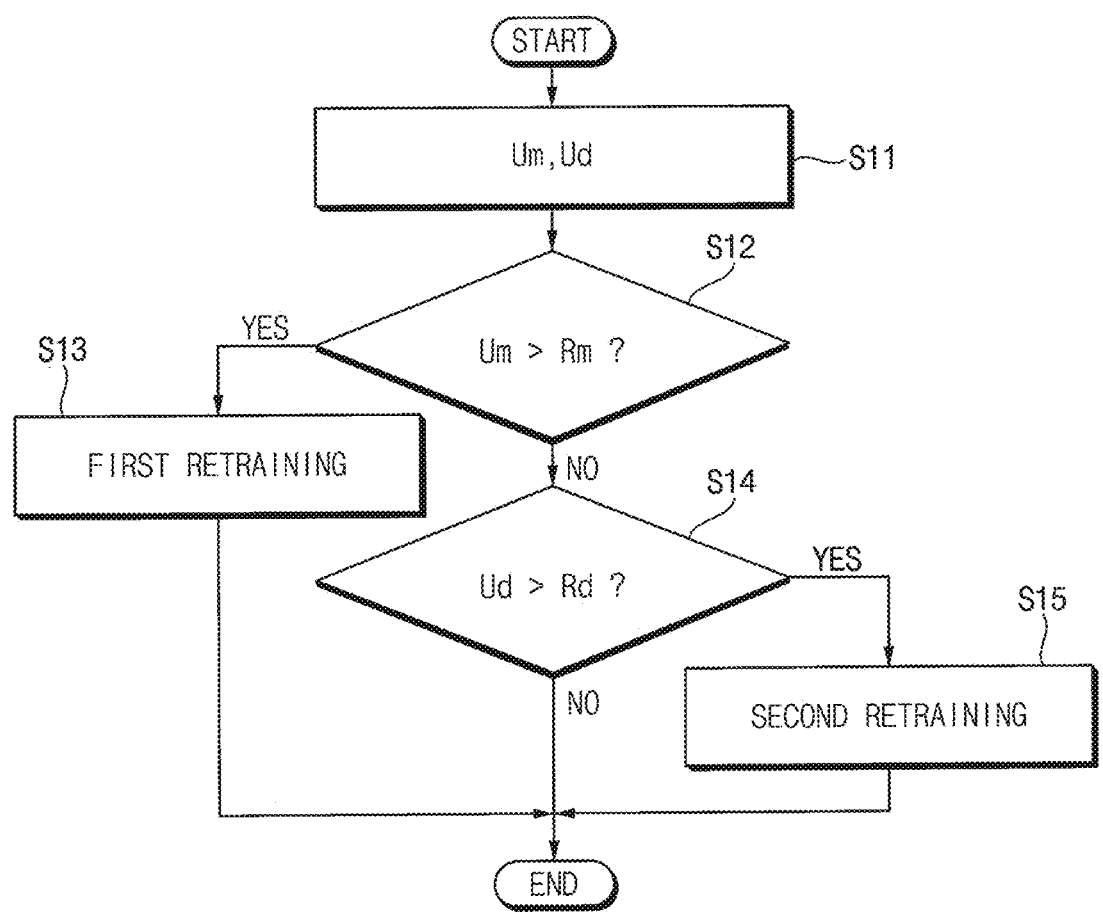
FIGS. 18 and 19 are flow charts illustrating example embodiments of retraining based on model uncertainty value and data uncertainty value in a method of predicting characteristics of semiconductor device according to some example embodiments.
Figure 19:
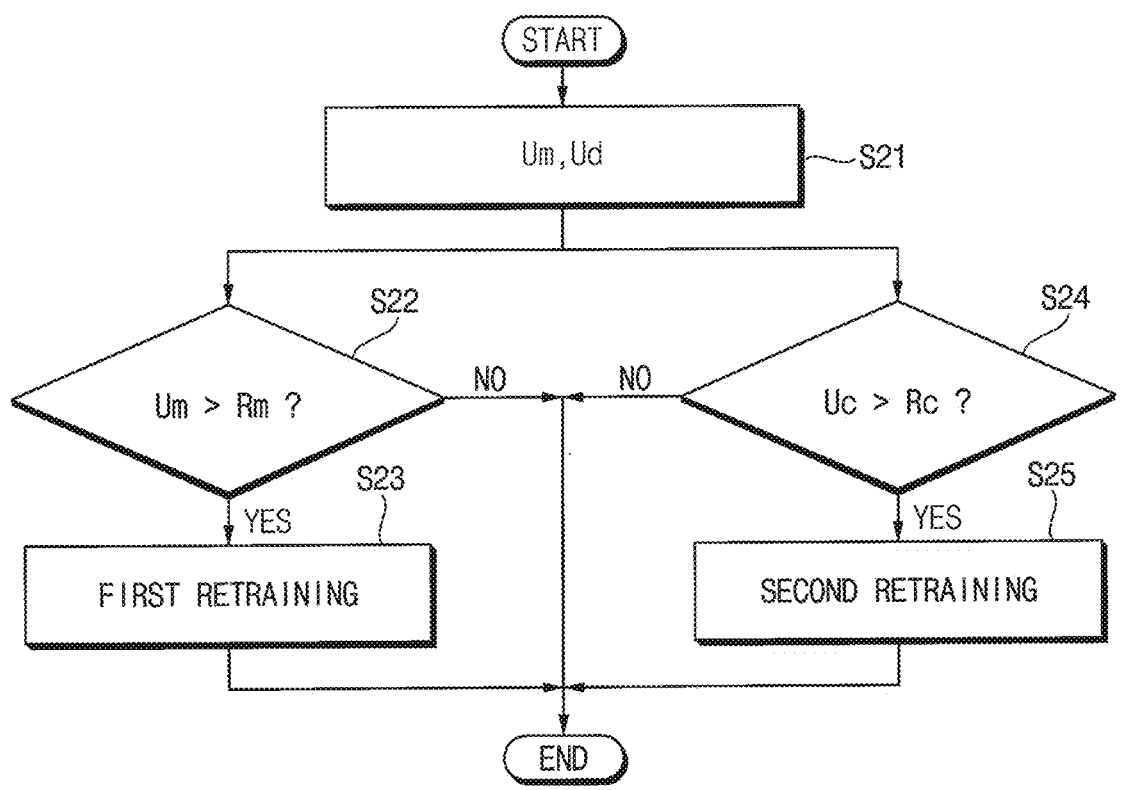

FIGS. 18 and 19 are flow charts illustrating example of retraining based on model uncertainty value and data uncertainty value in a method of predicting characteristics of semiconductor device according to some example embodiments.

Referring to FIGS. 2 and 18, the training control module 240 may generate, using the deep learning model DLM, the model uncertainty value Um and the data uncertainty value Ud corresponding to the input data of the deep learning model DLM (S11). As described above, the model uncertainty value Um may indicate the uncertainty of the prediction data caused by insufficiency of the basic training data and the data uncertainty value Ud may indicate the uncertainty of the prediction data caused by noises of the basic training data.

The training control module 240 may compare the model uncertainty value Um with the model reference value Rm (S12).

When the model uncertainty value Um is larger than the model reference value Rm (S12: YES), the training control module 240 may perform the first retraining (S13) as described above with reference to FIG. 14. As described above, the training control module 240 may generate the addition training data different from the basic training data using the compact model and retrain the deep learning model based on the addition training data. In this case, the training control module 240 may not initialize the deep learning model that has been trained based on the basic training data and retrain the deep learning model additionally based on the addition training data.

When the model uncertainty value Um is not larger than the model reference value Rm (S12: NO), the training control module 240 may compare the data uncertainty value Ud with the data reference value Rd (S14).

When the data uncertainty value Ud is larger than the data reference value Rd (S14: YES), the training control module 240 may perform the second retraining (S15) as described above with reference to FIG. 16. As described above, the training control module 240 may receive the measurement data, correct the compact model based on the measurement data, generate the updated training data using the corrected compact model, and then retrain the deep learning model based on the updated training data. In this case, the training control module 240 may initialize the deep learning model that has been trained based on the basic training data, and then retrain the initialized deep learning model based on the measurement training data.

As described with reference to FIG. 18, the training control module 240 may determine first whether to perform the first retraining based on the model uncertainty value. The training control module 240 may determine whether to perform the second retraining based on the data uncertainty value, only and when it is determined that the first retraining is not performed.

Referring to FIGS. 2 and 19, the training control module 240 may generate, using the deep learning model DLM, the model uncertainty value Um and the data uncertainty value Ud corresponding to the input data of the deep learning model DLM (S21). As described above, the model uncertainty value Um may indicate the uncertainty of the prediction data caused by insufficiency of the basic training data and the data uncertainty value Ud may indicate the uncertainty of the prediction data caused by noises of the basic training data.

The training control module 240 may compare the model uncertainty value Um with the model reference value Rm (S22).

When the model uncertainty value Um is larger than the model reference value Rm (S22: YES), the training control module 240 may perform the first retraining (S23) as described above with reference to FIG. 14. As described above, the training control module 240 may generate the addition training data different from the basic training data using the compact model and retrain the deep learning model based on the addition training data. In these cases, the training control module 240 may, e.g., not initialize the deep learning model that has been trained based on the basic training data and retrain the deep learning model additionally based on the addition training data.

In addition, the training control module 240 may compare the data uncertainty value Ud with the data reference value Rd (S24).

When the data uncertainty value Ud is larger than the data reference value Rd (S24: YES), the training control module 240 may perform the second retraining (S25) as described above with reference to FIG. 16. As described above, the training control module 240 may receive the measurement data, correct the compact model based on the measurement data, generate the updated training data using the corrected compact model, and then retrain the deep learning model based on the updated training data. In this case, the training control module 240 may initialize the deep learning model that has been trained based on the basic training data, and then retain the initialized deep learning model based on the measurement training data.

As described with reference to FIG. 19, the training control module 240 may determine whether to perform the first retraining and whether to perform the second retraining independently of each other.

The first retraining may be performed rapidly using the established compact model and the second retraining may require a significant amount of time for providing the measurement data. One of methods of FIGS. 15 and 16 may be properly selected considering various matters of designing and manufacturing of semiconductor products.

As described above, the method and the computing device according to example embodiments may efficiently predict the characteristics of the semiconductor device included in the new semiconductor product, by generating the basic training data including the process data using the established compact models corresponding to the previous semiconductor products and training the deep learning model based on the basic training data. In addition, the method and the computing device according to some example embodiments may provide the deep learning model capable of precisely predicting the characteristics of the semiconductor device by training the deep learning model to output the prediction data indicating the characteristics of the semiconductor device and the uncertainty data indicating the uncertainty of the prediction data and retraining the deep learning model based on the uncertainty data. In addition, the method and computing device according to example embodiments may efficiently provide the deep learning model capable of precisely predicting the characteristics of the semiconductor device by determining the method of retraining the deep learning model based on the type of the uncertainty of the prediction data. Through the enhanced prediction performance of the deep learning model the time and/or the cost of designing and manufacturing the semiconductor product including the semiconductor device and the performance of the semiconductor product may be enhanced.

As will be appreciated by one skilled in the art, example embodiments in this disclosure may be embodied as a system, method, computer program product, and/or a computer program product embodied in one or more computer readable medium(s) having computer readable program code embodied thereon. The computer readable program code may be provided to a processor of a general purpose computer, special purpose computer, and/or other programmable data processing apparatus. The computer readable medium may be a computer readable signal medium and/or a computer readable storage medium. The computer readable storage medium may be any tangible medium that can contain, and/or store a program for use by or in connection with an instruction execution system, apparatus, or device.

In this disclosure, the terms "driver," "unit" and/or "module" may denote elements that process (and/or perform) at least one function or operation and may be included in and/or implemented as processing circuitry such hardware, software, or the combination of hardware and software. For example, the processing circuitry more specifically may include (and/or be included in), but is not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the term "module" may refer to a software component and/or a hardware component such as a field programmable gate array (FPGA) or an application specific integrated circuit (ASIC), and/or combination of a hardware component and a software component. However, a "module" is not limited to software or hardware. A "module" may be configured to be included in an addressable storage medium or to reproduce one or more processors. Accordingly, for example, a "module" may include components such as software components, object-oriented software components, class components, and task components, processes. functions, attributes, procedures, subroutines, segments of program code, drivers, firmware, microcode, circuits, data, databases, data structures, tables, arrays, and variables. A function provided in components and "modules" may be integrated with a smaller number of components and "modules" or divided into additional components and "modules".

The example embodiments may be applied to designing and manufacturing any electronic devices and systems. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc. The foregoing is illustrative of some example embodiments and is not to be construed as limiting thereof. Although a few example embodiments have been described, those skilled in the art will readily appreciate that many modifications are possible in the example embodiments without materially departing from the present inventive concepts.

What is claimed is:

1. A method of predicting characteristics of a semiconductor device included in a target semiconductor product, the method being performed by at least one processor executing program codes, the program codes stored in computer readable media, the method comprising:
   generating basic training data corresponding to a combination of process data, device data, and simulation result data using a plurality of compact models, each of the plurality of compact models generating the simulation result data by performing a simulation based on the device data, the simulation result data indicating characteristics of semiconductor devices corresponding to the device data, the plurality of compact models respectively corresponding to a plurality of process data and a plurality of semiconductor products;
   training a deep learning model based on the basic training data such that the deep learning model is configured to output prediction data and a data uncertainty value indicating an uncertainty of the prediction data caused by noise of the basic training data;
   comparing the data uncertainty value with a data reference value;
   providing measurement data including characteristics of semiconductor devices, based on the data uncertainty value exceeding the data reference value;
   correcting the compact model based on measurement data, based on the data uncertainty value exceeding the data reference value;
   generating updated training data using the corrected compact model;
   retraining the deep learning model based on the updated training data;
   generating target prediction data based on the retrained deep learning model, the device data, and the process data corresponding to the target semiconductor product such that the target prediction data indicates characteristics of the semiconductor device included in the target semiconductor product; and
   evaluating, based on the generated target prediction data, a design of the semiconductor device prior to manufacturing the semiconductor device.

2. The method of claim 1, wherein the target semiconductor product is a new semiconductor product that is not included in the plurality of semiconductor products corresponding to the plurality of compact models.

3. The method of claim 1, wherein
   the plurality of process data is determined depending on a process-group combination of a process type,
   the process-group combination indicating a manufacturing process of each of the plurality of semiconductor products and a product group in which each of the plurality of semiconductor products is included.

4. The method of claim 3, wherein the process-group combination of the target semiconductor product is a new process-group combination that is not included in the process-group combinations of the plurality of semiconductor products.

5. The method of claim 1, wherein the plurality of semiconductor products and the target semiconductor product are memory devices.

6. The method of claim 1, wherein
   the device data indicate structure and operation condition of the semiconductor devices,
   the simulation result data and the prediction data indicate electrical characteristics of the semiconductor devices, and
   the process data indicate condition of manufacturing processes of the semiconductor devices.

7. The method of claim 1, wherein
   input data of the plurality of compact models include the device data and do not include the process data, and
   input data of the deep learning model include both of the process data and the device data.

8. The method of claim 1, wherein retraining the deep learning model further includes:
   determining a measurement data range corresponding to a range of data such that the data uncertainty value is larger than the data reference value, and
   wherein the measurement data are provided by measuring characteristics of the semiconductor device corresponding to the device data included in the measurement data range.

9. The method of claim 1, wherein the deep learning model that has been trained based on the basic training data is initialized, and the initialized deep learning model is trained based on the measurement data.

10. The method of claim 1, wherein the deep learning model includes a Bayesian Neural Network (BNN).

11. A method of predicting characteristics of a semiconductor device in a target semiconductor product, the method being performed by at least one processor executing program codes, the program codes stored in computer readable media, the method comprising:
   generating basic training data corresponding to a combination of process data, device data and simulation result data using a plurality of compact models, each of the plurality of compact models generating the simulation result data by performing a simulation based on the device data, the simulation result data indicating characteristics of a semiconductor device corresponding to the device data, the plurality of compact models respectively corresponding to a plurality of process data and a plurality of semiconductor products;

training a deep learning model based on the basic training data such that the deep learning model is configured to output prediction data and a model uncertainty value, the prediction data indicating the characteristics of the semiconductor device and the model uncertainty value indicating uncertainty of the prediction data caused by insufficiency of the basic training data;

comparing the model uncertainty value with a model reference value;

generating addition training data using the compact model, based on the model uncertainty value being larger than the model reference value;

determining an addition data range corresponding to a range of the device data such that the model uncertainty value is larger than the model reference value;

retraining the deep learning model based on the addition training data;

generating target prediction data based on the retrained deep learning model, the device data, and the process data corresponding to the target semiconductor product such that the target prediction data indicates characteristics of the semiconductor device included in a target semiconductor product included in the target semiconductor product; and evaluating, based on the generated target prediction data, a design of the semiconductor device prior to manufacturing the semiconductor device, wherein the addition training data are different from the basic training data.

12. A computing device comprising:
at least one processor; and
a computer readable medium storing program codes and a plurality of compact models, the program codes being executed by the at least one processor to generate a deep learning model using a plurality of compact models, each of the plurality of compact models generating simulation result data by performing a simulation based on device data, wherein the simulation result data indicate characteristics of semiconductor devices corresponding to the device data, wherein the plurality of compact models respectively correspond to a plurality of process data and a plurality of semiconductor products;

wherein the at least one processor, when executing the program codes, is configured to generate basic training data corresponding to a combination of the process data, the device data and the simulation result data using the plurality of compact models, train the deep learning model based on the basic training data such that the deep learning model is configured to output prediction data and a data uncertainty value indicating an uncertainty of the prediction data caused by noise of the basic training data;

compare the data uncertainty value with a data reference value;

provide measurement data including characteristics of semiconductor devices, based on the data uncertainty value exceeding the data reference value;

correct the compact model based on measurement data, based on the data uncertainty value exceeding the data reference value;

generate updated training data using the corrected compact model;

retrain the deep learning model based on the updated training data;

generate target prediction data based on the retrained deep learning model, the device data and the process data corresponding to a target semiconductor product such that the target prediction data indicates characteristics of the semiconductor device included in the target semiconductor product; and evaluate, based on the generated target prediction data, a design of the semiconductor device prior to manufacturing the semiconductor device.

* * * * *